US012515359B2

(12) United States Patent
Garavaglia et al.

(10) Patent No.: US 12,515,359 B2
(45) **Date of Patent: *Jan. 6, 2026**

(54) SAFETY CUTTER WITH BLADE CHANGE/STORAGE MECHANISM

(71) Applicant: PACIFIC HANDY CUTTER, INC., Irvine, CA (US)

(72) Inventors: Joseph P. Garavaglia, Newport Beach, CA (US); Brandon L. Spoelstra, Huntingdon Beach, CA (US); Markus E. Gropl, Huntingdon Beach, CA (US); Mark Marinovich, Rancho Santa Fe, CA (US)

(73) Assignee: PACIFIC HANDY CUTTER, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/675,093

(22) Filed: May 27, 2024

(65) Prior Publication Data

US 2024/0316803 A1 Sep. 26, 2024

Related U.S. Application Data

(60) Continuation of application No. 17/114,488, filed on Dec. 7, 2020, now Pat. No. 11,992,964, which is a continuation of application No. 15/839,764, filed on Dec. 12, 2017, now Pat. No. 10,857,685, which is a division of application No. 13/250,524, filed on Sep. 30, 2011, now Pat. No. 9,840,013, which is a (Continued)

(51) Int. Cl.
*B26B 5/00* (2006.01)
*B26B 29/02* (2006.01)

(52) U.S. Cl.
CPC .............. *B26B 5/003* (2013.01); *B26B 29/02* (2013.01); *B26B 5/00* (2013.01)

(58) Field of Classification Search
CPC ........... B26B 5/00; B26B 5/001; B26B 5/003; B26B 29/00; B26B 29/02; B26B 29/025; B26B 1/08
USPC .......... 30/162, 335, 125, 151; 292/137, 138, 292/145
See application file for complete search history.

(56) References Cited

U.S. PATENT DOCUMENTS 3,879,847 A * 4/1975 Roll ........................ B26B 5/001 30/162
4,949,458 A * 8/1990 Davis ...................... B26B 5/001 30/162

(Continued)

FOREIGN PATENT DOCUMENTS

WO WO-2008066365 A1 * 6/2008 ............. B26B 5/002

*Primary Examiner* — Laura M Lee
(74) *Attorney, Agent, or Firm* — Fox Rothschild LLP

(57) ABSTRACT

A cutter apparatus includes a housing and a blade holder coupled to the housing, wherein the housing includes a distal portion (e.g., a blade storage compartment) that is both slidably and pivotally coupled to portions of the housing and configured to serve as a cover for the blade holder. The cutter apparatus can also include a cover release device configured to facilitate repositioning the cover between a locked position at which the cover is secured to the housing and a released position at which at least a portion of the cover is free to pivotally reposition away from the housing providing access to the blade holder.

9 Claims, 27 Drawing Sheets

Related U.S. Application Data continuation-in-part of application No. 12/111,847, filed on Apr. 29, 2008, now Pat. No. 8,069,571.

(56) References Cited

U.S. PATENT DOCUMENTS

| | | | | | |
|---|---|---|---|---|---|
| 5,878,501 | A * | 3/1999 | Owens | B26B 5/00 | 30/286 |
| 6,148,520 | A * | 11/2000 | Berns | B26B 5/003 | 30/162 |
| 6,308,418 | B1 * | 10/2001 | Sweet | B26B 5/001 | 30/2 |
| 6,578,266 | B2 * | 6/2003 | Chomiak | B26B 5/005 | 30/2 |
| 7,637,015 | B1 * | 12/2009 | Biolchini, Jr. | B26B 5/00 | 30/162 |
| 2005/0193568 | A1 * | 9/2005 | Peyrot | B26B 29/02 | 30/162 |
| 2009/0151168 | A1 * | 6/2009 | Dadam | B26B 5/001 | 30/162 |

* cited by examiner

FIG. 36
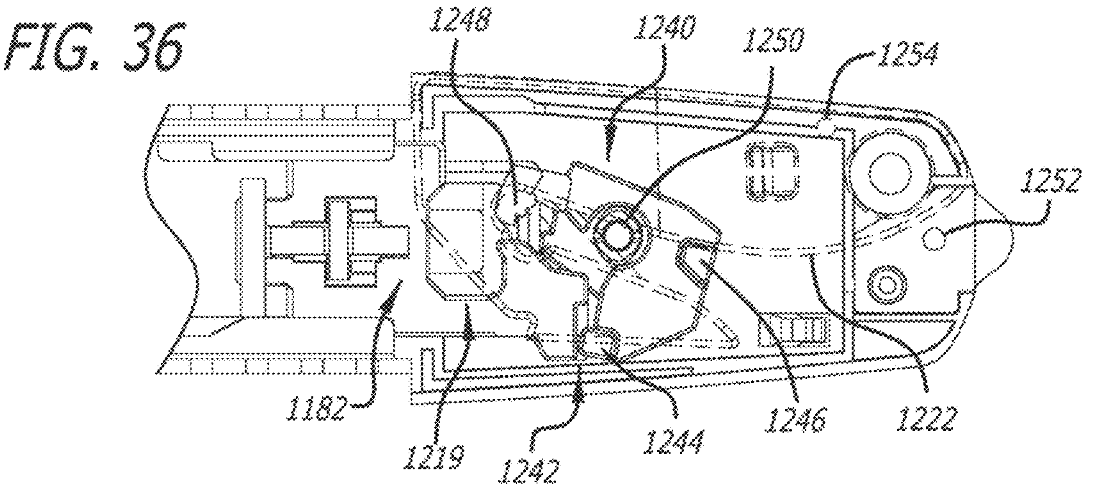
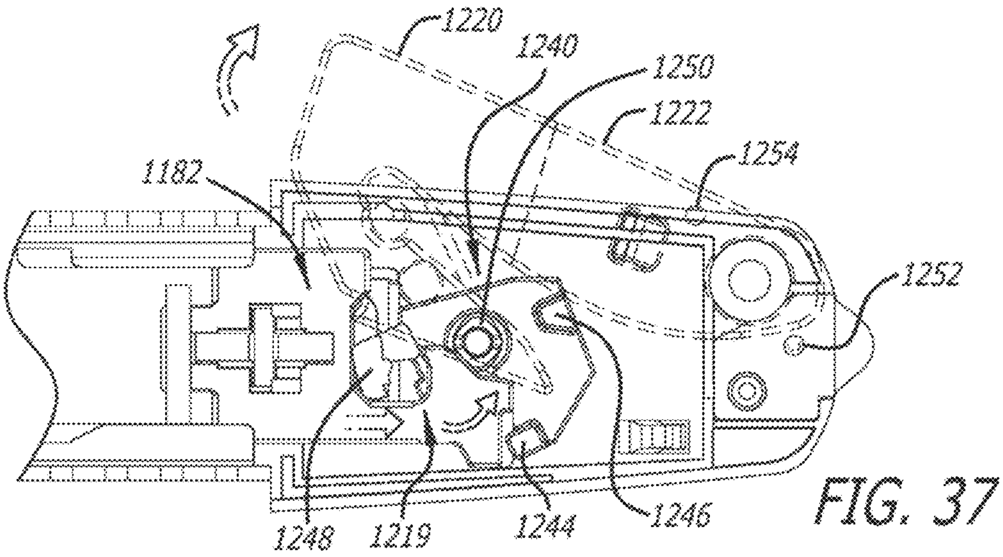
FIG. 37
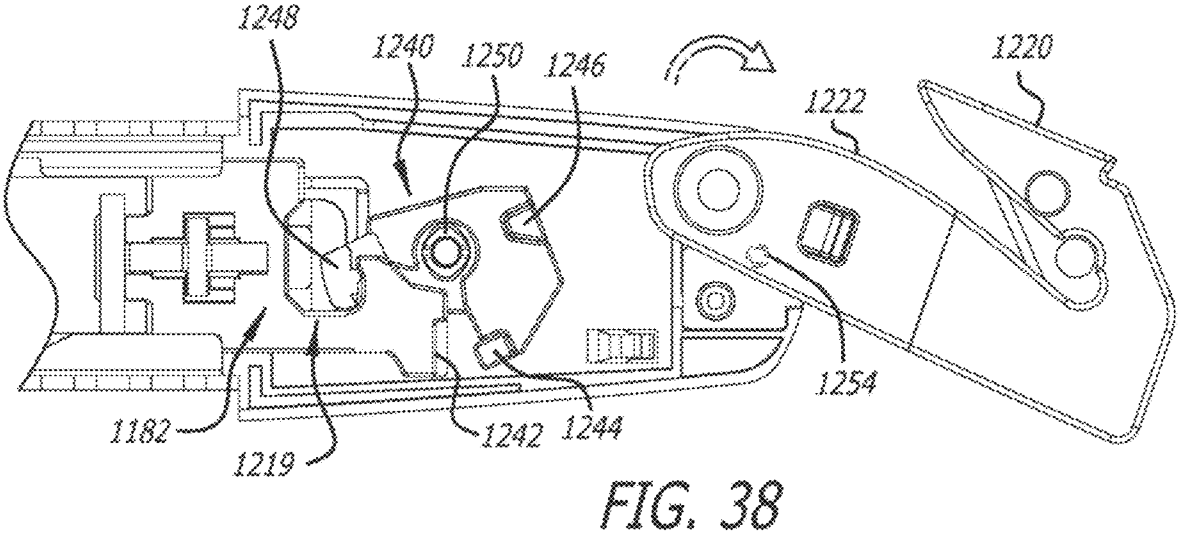
FIG. 38

FIG. 39
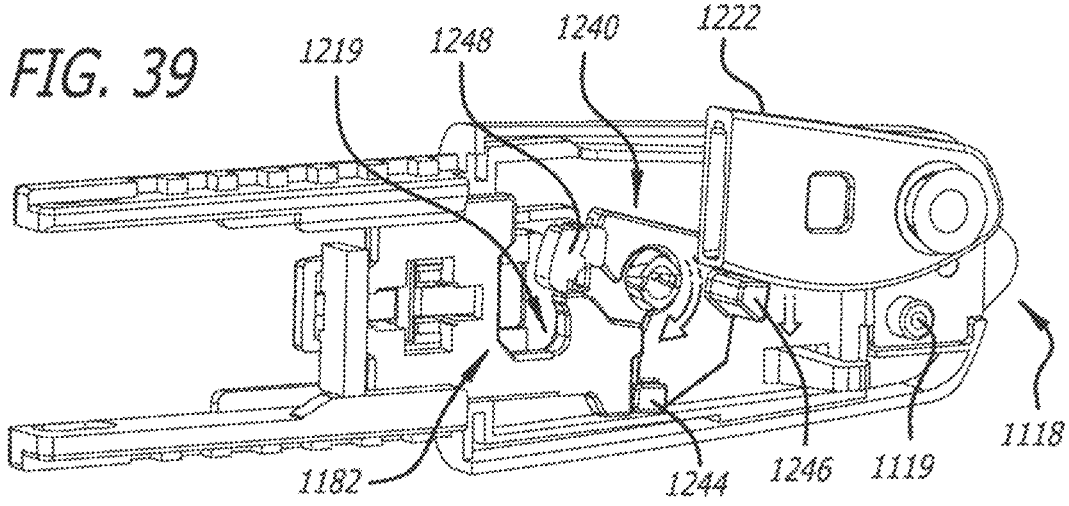
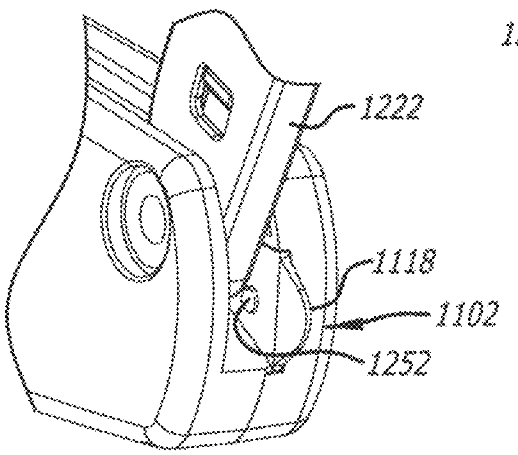
FIG. 40
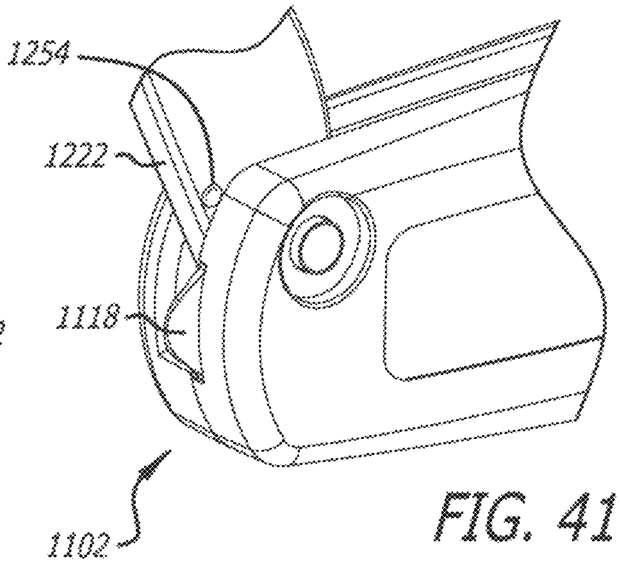
FIG. 41
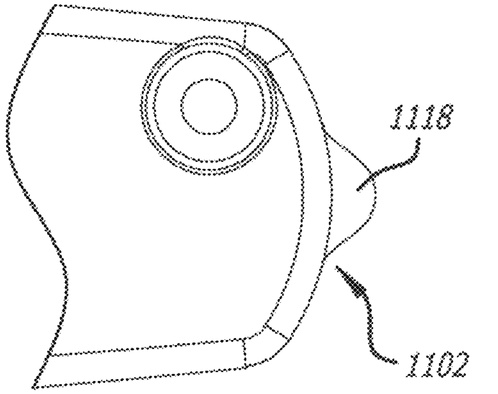
FIG. 42
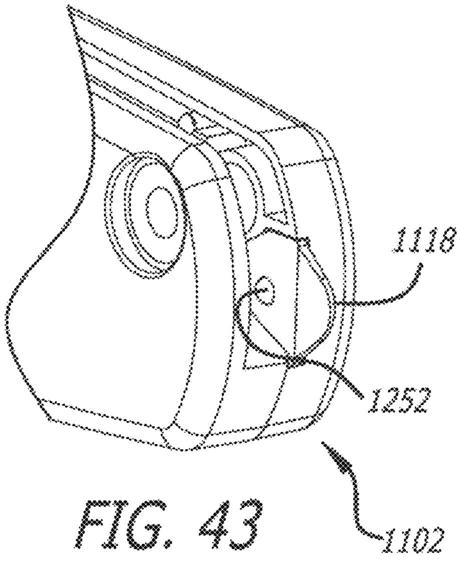
FIG. 43

SAFETY CUTTER WITH BLADE CHANGE/STORAGE MECHANISM

CROSS-REFERENCE TO RELATED APPLICATIONS

This application is a continuation of U.S. patent application Ser. No. 17/114,488, entitled "Safety Cutter with Blade Change/Storage Mechanism", filed on Dec. 7, 2020 (now U.S. Pat. No. 11,992,964, issued on May 28, 2024), which is a continuation of U.S. patent application Ser. No. 15/839,764, entitled "Safety Cutter with Blade Change/Storage Mechanism", filed on Dec. 12, 2017 (now U.S. Pat. No. 10,857,685, issued on Dec. 8, 2020), which is a divisional of U.S. patent application Ser. No. 13/250,524, entitled "Safety Cutter with Blade Change/Storage Mechanism", filed on Sep. 30, 2011 (now U.S. Pat. No. 9,840,013, issued on Dec. 12, 2017), which is a continuation-in-part of U.S. patent application Ser. No. 12/111,847, entitled "Spring Back Safety and Film Cutter", filed on Apr. 29, 2008 (now U.S. Pat. No. 8,069,571, issued on Dec. 6, 2011), which are hereby incorporated by reference. This application is related to U.S. patent application Ser. No. 13/250,473, entitled "Safety Cutter with Guard-actuated Blade Deployment", filed on Sep. 30, 2011 (now U.S. Pat. No. 9,676,106, issued on Jun. 13, 2017) and U.S. patent application Ser. No. 13/250,565, entitled "Safety Cutter with Blade Depth Selector/Interlock Mechanism", filed on Sep. 30, 2011 (now U.S. Pat. No. 10,093,026 issued on Oct. 9, 2018), which are also hereby incorporated by reference.

TECHNICAL FIELD

The present invention relates generally to cutters and, in particular, a cutter with a mechanism or device that facilitates a blade change operation for the cutter and/or blade storage within the cutter.

BACKGROUND ART

A great variety of knives, cutters, safety cutters, and cutter apparatuses are known. Features variously found in prior knives, cutters, safety cutters, and cutter apparatuses include mechanisms and devices facilitating, for example, blade deployment, blade depth adjustment, blade change, or blade storage.

It would be useful to be able to provide one or more of: a cutter with a mechanism or device that facilitates improved, advantageous, or otherwise desirable or useful deployment of a blade from the cutter; a cutter with a mechanism or device that facilitates an improved, advantageous, or otherwise desirable or useful blade depth adjustment for the cutter; a cutter with a mechanism or device that facilitates an improved, advantageous, or otherwise desirable or useful blade change operation for the cutter; and a cutter with a mechanism or device that facilitates improved, advantageous, or otherwise desirable or useful blade storage within the cutter.

SUMMARY OF THE INVENTION

In an example embodiment, a cutter apparatus includes a housing and a blade holder coupled to the housing, wherein the housing includes a distal portion that is both slidably and pivotally coupled to portions of the housing and configured to serve as a cover for the blade holder.

In an example embodiment, a cutter apparatus includes a housing, a blade holder coupled to the housing, a cover for the blade holder, the cover being coupled to and repositionable in relation to the housing, and a cover release device configured to facilitate repositioning the cover between a locked position at which the cover is secured to the housing and a released position at which at least a portion of the cover is free to pivotally reposition away from the housing providing access to the blade holder.

In an example embodiment, a cutter apparatus includes a housing, a blade holder coupled to the housing, and a blade storage compartment configured to serve as a cover for the blade holder.

BRIEF DESCRIPTION OF THE DRAWINGS

FIGS. 36 and 37 are cross-sectional side views of the cutter apparatus of FIG. 14 showing activation of the film cutter by repositioning the selector which, in turn, repositions a lever causing the film cutter to disengage from the latch;

FIG. 38 is a cross-sectional side view of the cutter apparatus of FIG. 14 showing that when the film cutter is activated a hook portion of the lever prevents the selector from being able to move forward (distally), so that the main cutting blade cannot be accidentally activated while the film cutter is in use;

FIG. 39 is cross-sectional side view of the cutter apparatus of FIG. 14 showing how the lever repositions disengaging from the selector in response to the film cutter being pushed back into its closed position;

FIGS. 40 and 41 are perspective views of the cutter apparatus of FIG. 14 showing the protrusion (of the cutter apparatus body) and the divot (on the base portion of the film cutter), respectively, that interface to hold the film cutter in place in its opened position; and FIGS. 42 and 43 are side and perspective views, respectively, of the cutter apparatus of FIG. 14 showing a tape splitter secured between body portions (halves) of the housing and protruding from the back end (proximal base portion) of the cutter apparatus.

DISCLOSURE OF INVENTION

Figure 1:
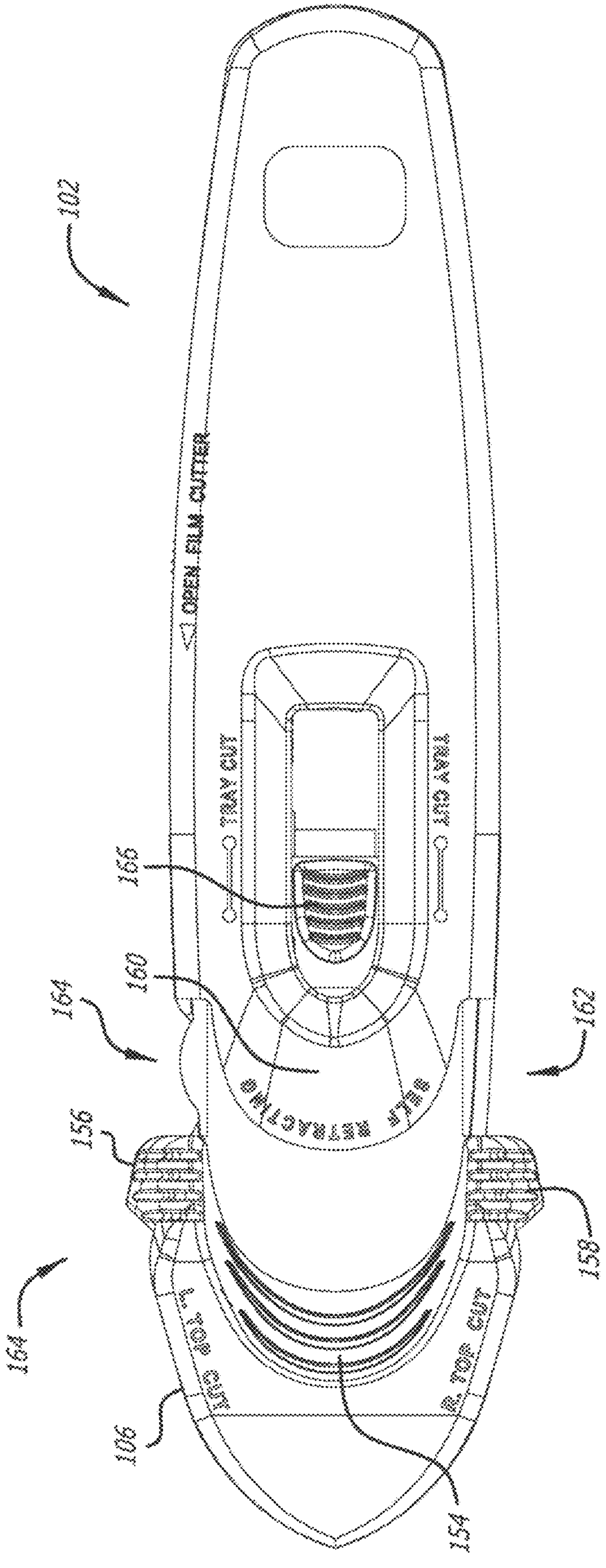
FIG. 1 is a top view of an example embodiment of a cutter apparatus.
Figure 2:
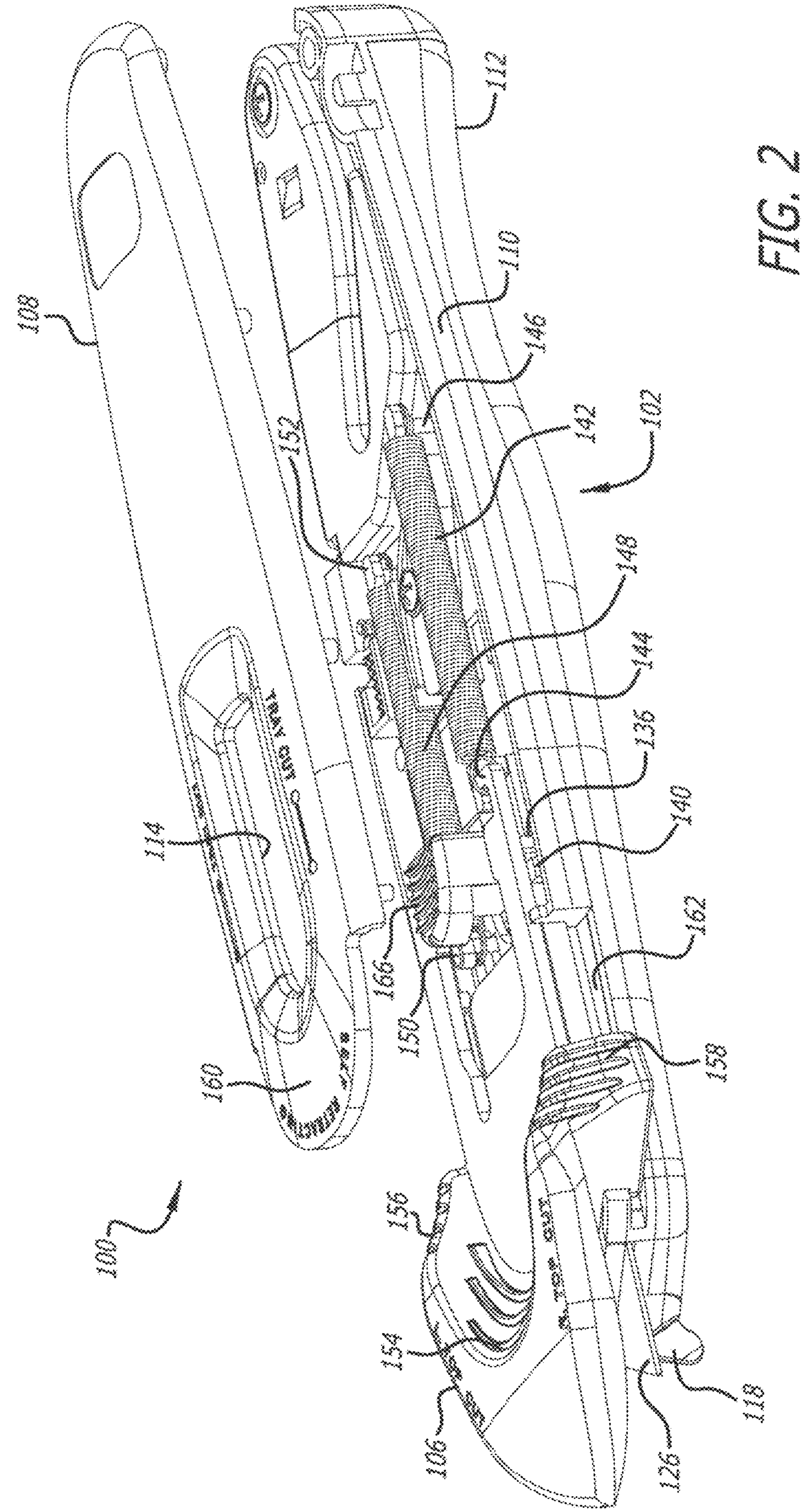
FIG. 2 is a perspective view of the cutter apparatus of FIG. 1, shown with its top portion separated from the main body portion, and its blade extended to a partially-extended position in response to its blade guard being pushed forward.
Figure 3:
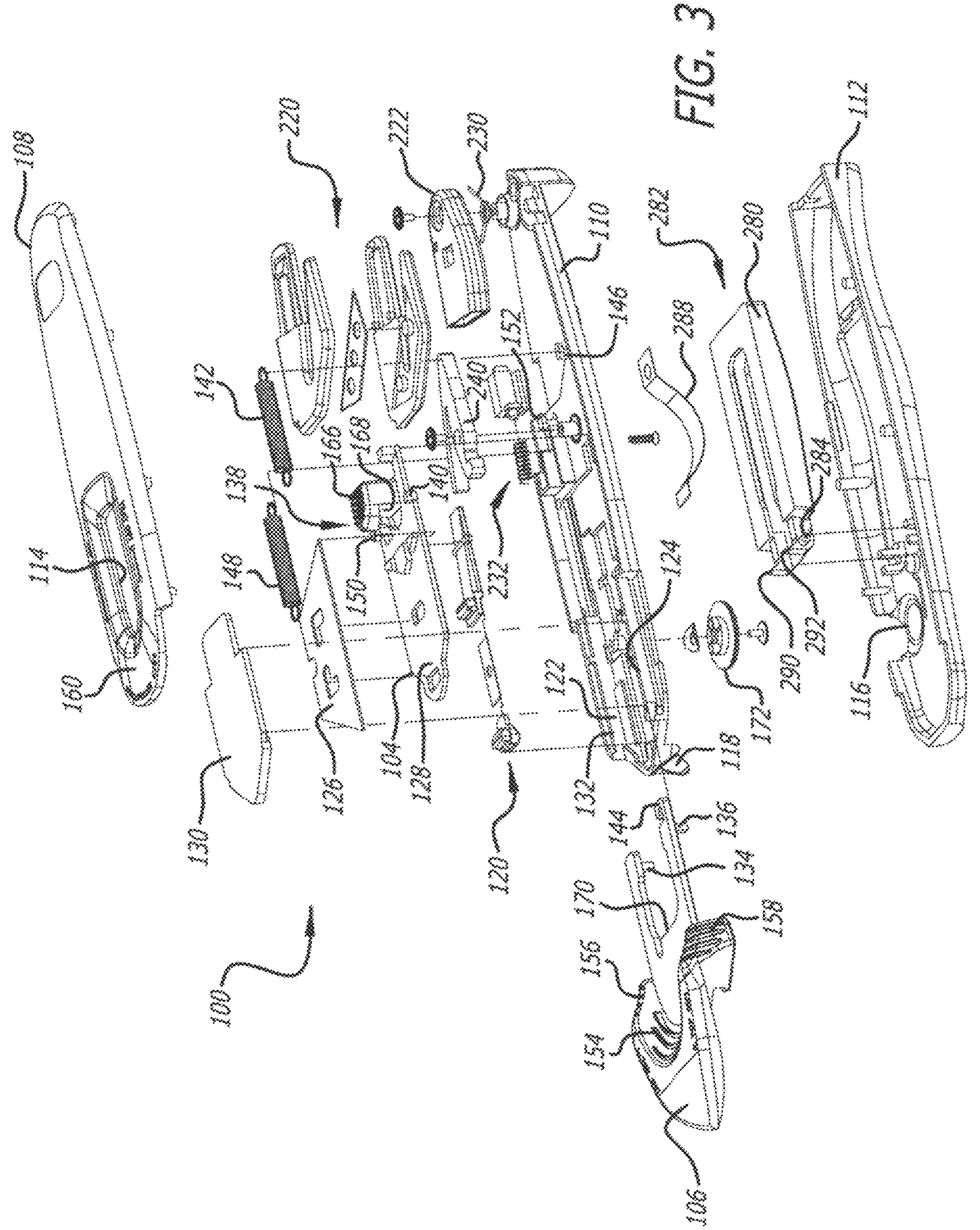
FIG. 3 is an exploded perspective view of the cutter apparatus of FIG. 1.

Referring to FIGS. 1-3, in an example embodiment, a cutter apparatus 100 includes a housing 102, a slider 104, and a blade guard 106 (which also functions as a cutting guide). In this example embodiment, the housing 102 includes an upper housing portion 108, a backbone structure 110, and a lower housing portion 112 formed as shown to facilitate being interfitted together during assembly. The upper housing portion 108 includes a slider window 114, and the lower housing portion 112 includes a dial window 116. The backbone structure 110, by way of example, can be formed from a rigid material such as zinc. In this example embodiment, the backbone structure 110 includes a tape splitter 118 shaped and positioned as shown adjacent to the blade guard 106.

A blade retention/release assembly 120 (discussed below in greater detail) is secured within the housing 102. The slider 104 is supported within the backbone structure 110 by channels 122, 124. A front blade 126 is supported by the top surface 128 of the slider 104. A cover plate 130 is supported at its forward end by surface 132 of the backbone structure 110. The blade guard 106, in turn, is positioned over the cover plate 130 and supported within the housing 102 such that the blade guard 106 can be slid longitudinally. In this example embodiment, the blade guard 106 includes follower posts 134, 136 which respectively make contact with surfaces 138, 140, of the slider 104 when the blade guard 106 is slid forward.

FIG. 2 illustrates the cutter apparatus 100 in operation with the front blade 126 being extended to a partially-extended ("top cut") position in response to the blade guard 106 being pushed forward. During this motion, force applied (by a user of the cutter apparatus 100) to the blade guard 106 overcomes a counterbias applied by a guard spring 142, which is secured as shown between a retention hook 144 (of the blade guard 106) and a post 146 (of the backbone structure 110). This force also must overcome a counterbias applied by a slider spring 148, which is secured as shown between a post 150 (of the slider 104) and a post 152 (of the backbone structure 110). In this example embodiment, the blade guard 106 and the slider 104 are independently spring biased.

Accordingly, FIG. 2 illustrates that in this example embodiment the slider 104 and the blade guard 106 are configured to move in tandem as the blade guard 106 is deployed. In an example embodiment, a cutter apparatus includes a housing shaped to be hand-held, a slider configured to support a front blade, the slider being mechanically coupled to the housing and configured to be moved longitudinally along the housing, and a blade guard mechanically coupled to the housing and configured to be extended and retracted adjacent to the front end of the housing, wherein the slider and the blade guard are configured to move in tandem.

The blade guard 106 includes one or more ergonomically designed surfaces or portions for pushing the blade guard 106 forward. In this example embodiment, the blade guard 106 includes a center grip portion 154 and two adjacent side grip portions 156, 158 formed as shown. In this example embodiment, the center grip portion 154 extends above a top surface 160 of the housing 102, and the side grip portions 156, 158 extend wider than the housing 102.

In operation, some users of the cutter apparatus 100 may find that the quickest and easiest way to deploy the front blade 126, e.g., to "top cut" a box, is to use their thumb to press the center grip portion 154 forward and hold it in that forward position during the cutting motion. When the user lets go of the blade guard 106, the blade guard 106 is retracted backward by the guard spring 142. This backward motion of the blade guard 20106, in turn, releases the slider 104 to be retracted backward by the slider spring 148.

For extended intervals of cutting, some users of the cutter apparatus 100 may find it more comfortable to position a finger behind one or both of the side grip portions 156, 158. In this example embodiment, the housing 102 includes recesses 162, 164 which further enhance gripping comfort when using the side grip portions 156, 158, respectively.

Figure 4:
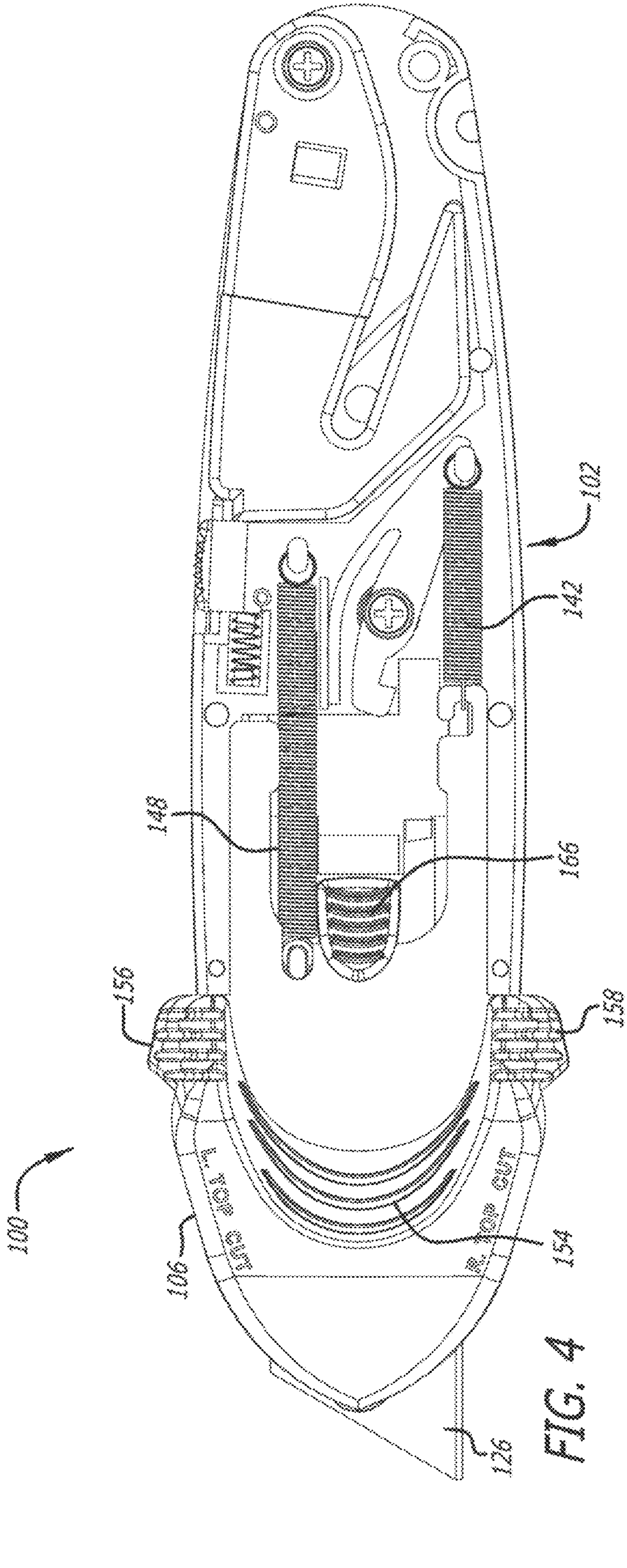
FIGS. 4 and 5 are top and perspective views, respectively, of the cutter apparatus of FIG. 1, shown with its top portion removed, and its blade extended to a fully-extended position in response to its button being pushed forward.
Figure 5:
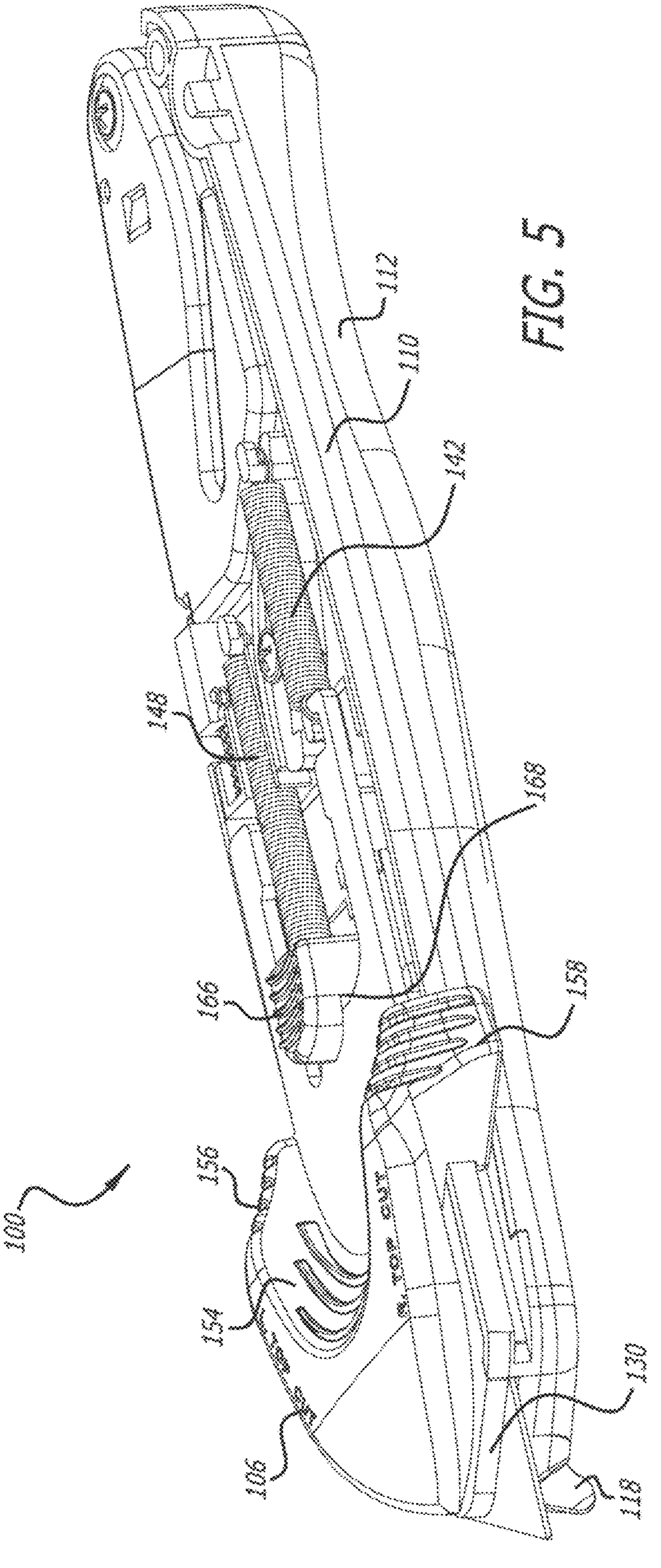

FIGS. 4 and 5 illustrate the cutter apparatus 100 in operation with the front blade 126 being extended to a fully-extended ("tray cut") position in response to the slider 104 being directly pushed forward. More specifically, when a button 166 of the slider 104 is pressed forward by a user of the cutter apparatus 100, this motion brings a post surface 168 (of the slider 104) into contact with a surface 170 (of the blade guard 106; see FIG. 3, also) which extends the blade guard 106 in tandem with extension of the slider 104. During this motion, force applied (by a user of the cutter apparatus 100) to the slider 104 overcomes a counterbias applied by the slider spring 148. This force also must overcome a counterbias applied by the guard spring 142.

Accordingly, FIGS. 4 and 5 illustrates that in this example embodiment the slider 104 and the blade guard 106 are configured to move in tandem as the slider 104 is deployed. Referring to FIG. 5, the side grip portions 156, 158 (of the blade guard 106) are shaped as shown to slide along complementary surfaces on the outside of the backbone structure 110.

Referring to FIGS. 6, 7 and 13A-13E, in this example embodiment, the cutter apparatus 100 includes a depth stop mechanism for controlling the extent to which and if the slider 104 can be pushed forward to extend the front blade 126 from the housing 102. In this example embodiment, the depth stop mechanism is dial-controlled and includes a dial 172 which is supported by the dial window 116 (FIG. 3). In this example embodiment, the dial 172 is mechanically coupled to the housing 102 and configured such that a protrusion (or dog) 174 on the back side of the dial 172 is selectively brought (by rotating the dial 172) into contact with a stop surface on the slider 104 depending upon a selected amount the front blade 126 is to be permitted to be extended from the housing 102.

Figure 13A:
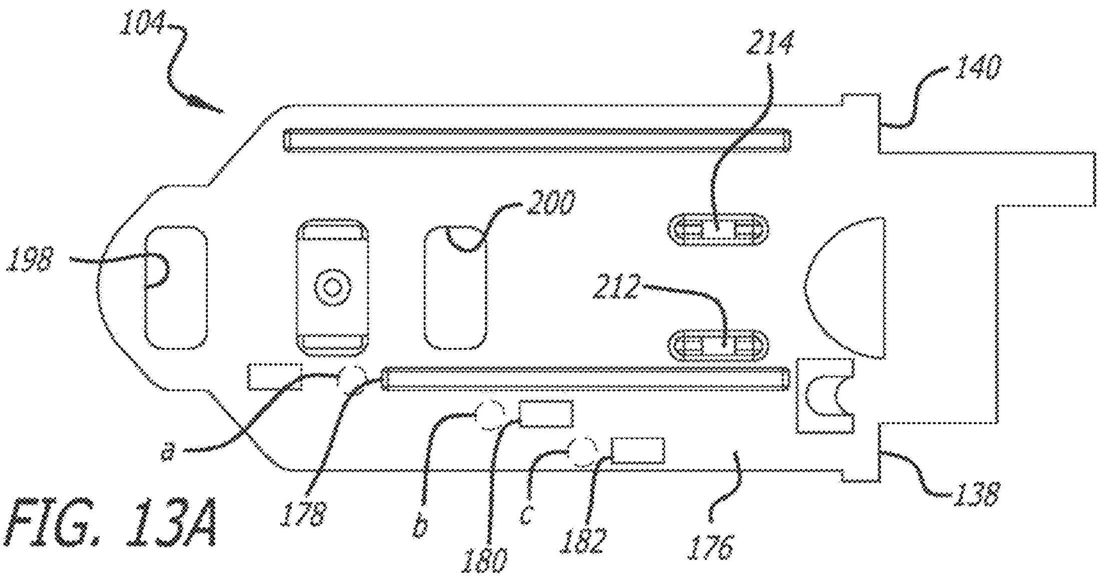
FIG. 13A-13E show the slider in bottom, side, top, end, and perspective views, respectively.
Figure 13B:
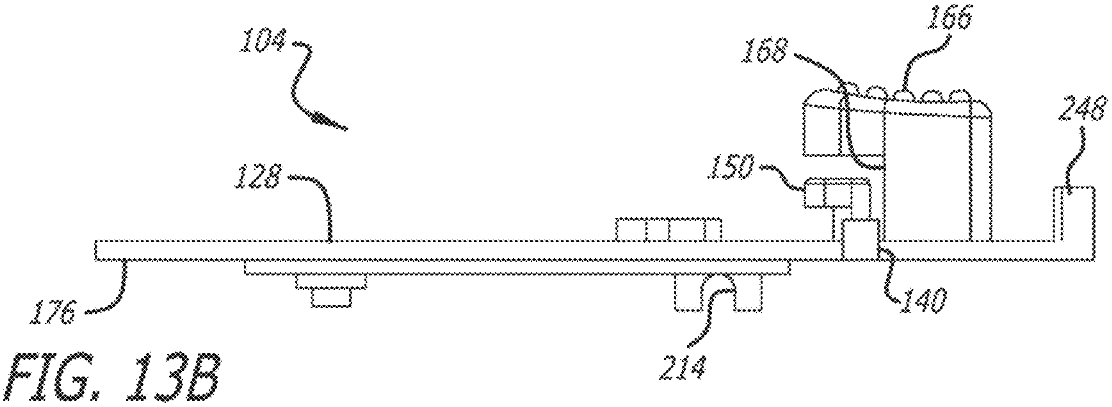
Figure 13C:
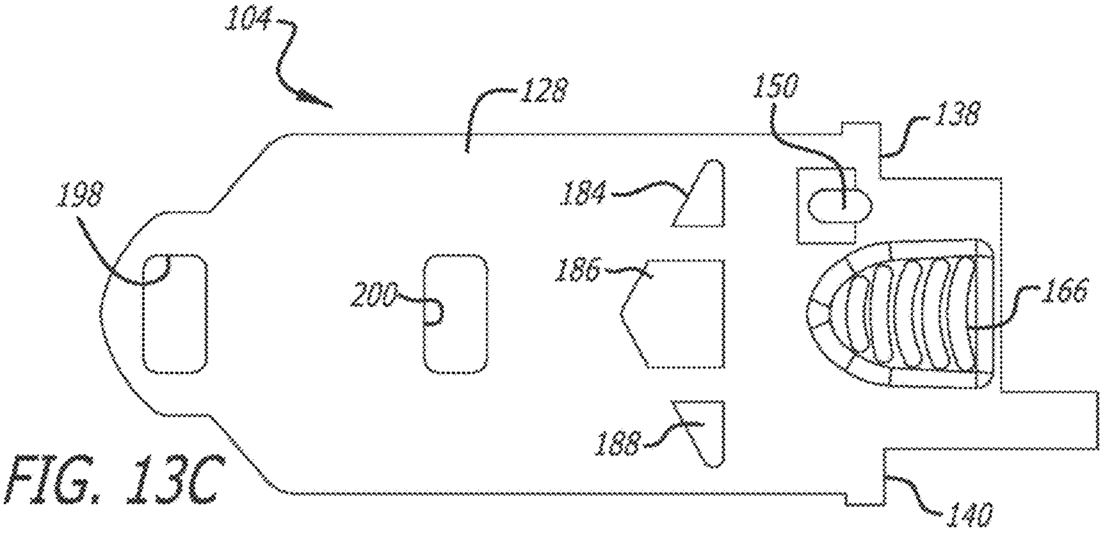
Figure 13D:
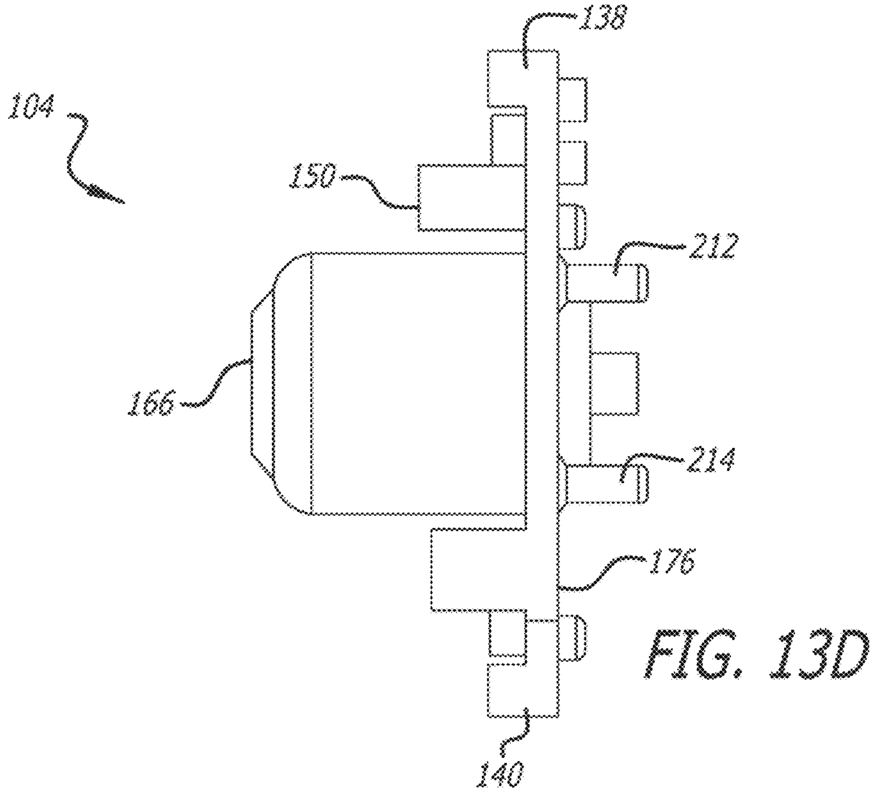
Figure 13E:
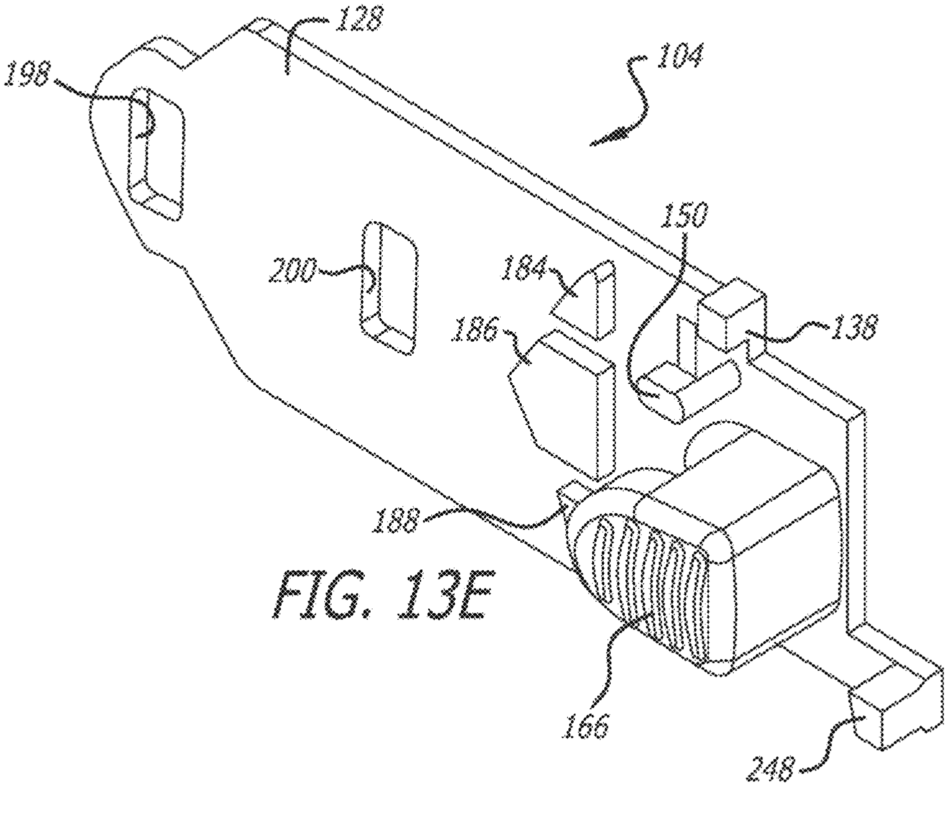

Referring to FIG. 13A, in this example embodiment, a bottom surface 176 of the slider 104 includes a series of three stop surfaces 178, 180, and 182 formed as shown.

The protrusion 174 is selectively brought into contact (at the locations denoted "a", "b", "c") with one of the stop surfaces 178, 180, and 182, respectively, depending upon whether the slider 104 is to be locked, permitted to move forward to a partially-extended blade position, or permitted to move forward to a fully-extended blade position.

It should be understood that alternative structures can be used to provide a depth stop mechanism for controlling the extent to which and if the slider 104 can be pushed forward. In an alternative embodiment, the depth stop mechanism has a different number of stops. In an alternative embodiment, the cutter apparatus 100 does not include a depth stop mechanism in the form of a dial. Independent of whether the cutter apparatus 100 includes a depth stop mechanism, either the slider 104 or the blade guard 106 can be repositioned to gradually extend the front blade 126 a specific amount depending upon the nature of the cutting task.

Figure 8:
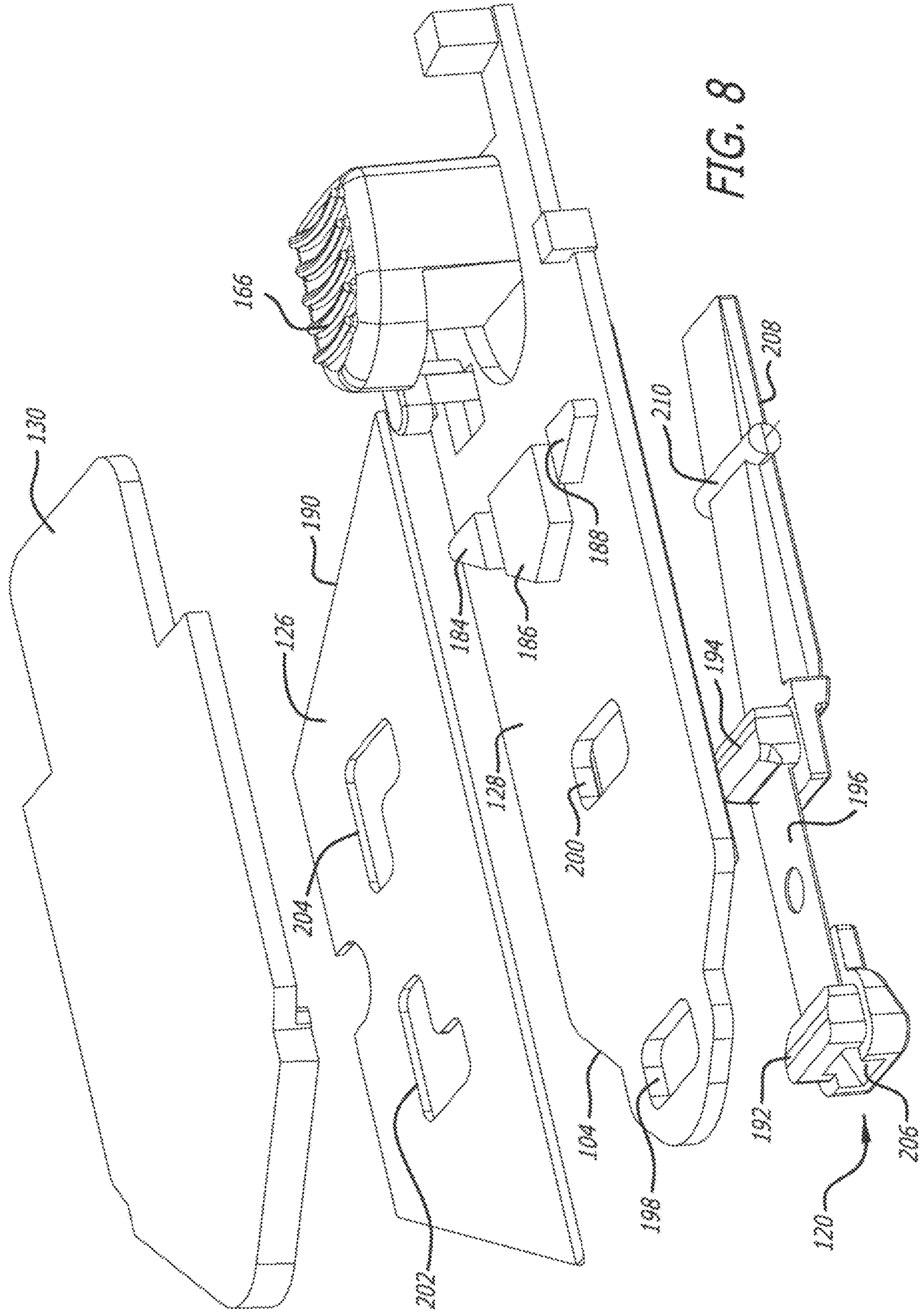
FIG. 8 is an exploded perspective view of the cover plate, blade, slider and blade retention/release assembly of the cutter apparatus of FIG. 1.

FIG. 8 is an exploded perspective view of the cover plate 130, front blade 126, slider 104 and blade retention/release assembly 120. Several features of the cutter apparatus 100 are now described with reference to this figure, namely, the ambidextrous nature of the slider 104 and the multi-stage blade release functionality provided by the slider 104 and the blade retention/release assembly 120 being manipulated in conjunction.

The slider 104 includes one or more symmetrical arranged support structures for the front blade 126. In this example embodiment, the one or more symmetrical arranged support structures include raised structures 184, 186, and 188 which are shaped and positioned as shown on the top surface 128 of the slider 104. In this example embodiment, the raised structures 184, 186, and 188 are generally V-shaped. More generally, the one or more symmetrical arranged support structures are configured such that at least one of the support structures faces an edge 190 of the front blade 126 when the blade is oriented for right-handed cutting, and at least one of the support structures faces the edge of the blade when the blade is oriented for left-handed cutting. It should be appreciated that an alternative support structure can be used to facilitate ambidextrous use of the cutter apparatus 100 in respect to cutting with the front blade 126.

With respect to the afore-mentioned multi-stage blade release functionality, the blade retention/release assembly 120 includes first and second blade retention/release tabs 192, 194 which are mechanically coupled together with a blade release spring 196 and sized to fit through complementary holes 198, 200 in the slider 104 and holes 202, 204 in the front blade 126. The first blade retention/release tab 192 including a ramp-shaped surface 206 which is brought into contact with a portion of the housing 102 when the slider 104 is advanced to its foremost position such that the first blade retention/release tab 192 is twisted away and withdrawn from the front blade 126 and the slider 104 (i.e., the first stage of the blade release process).

In this example embodiment, the blade retention/release assembly 120 further includes a tab portion 208 that is exposed through an opening in the housing 102, and a pivot member 210 that is pivotally secured at opposite ends thereof within recesses 212, 214 (FIG. 13A) which are located at the bottom surface 176 of the slider 104. The tab portion 208 is configured such that when the tab portion 208 is depressed, while the first blade retention/release tab 192 has already been disengaged from the front blade 126 and the slider 104, the tab portion 208 in turn disengages the second blade retention/release tab 194 from the front blade 126 and the slider 104, thereby releasing the front blade 126 to be withdrawn from the housing 102.

Figure 9:
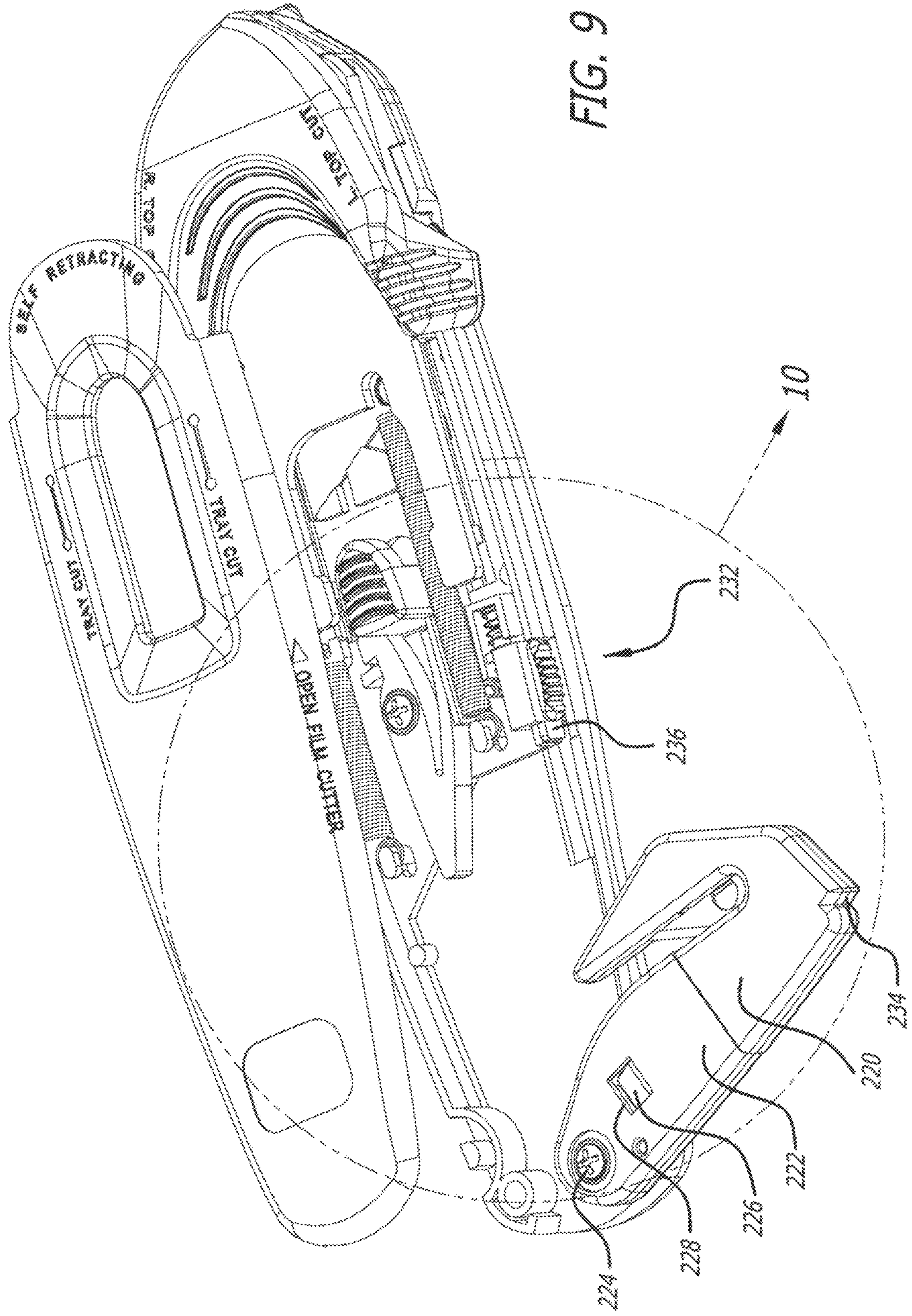
FIG. 9 is a perspective view of the cutter apparatus of FIG. 1, shown with its top portion separated from the main body portion, and its detachable film cutter partially deployed.
Figure 10:
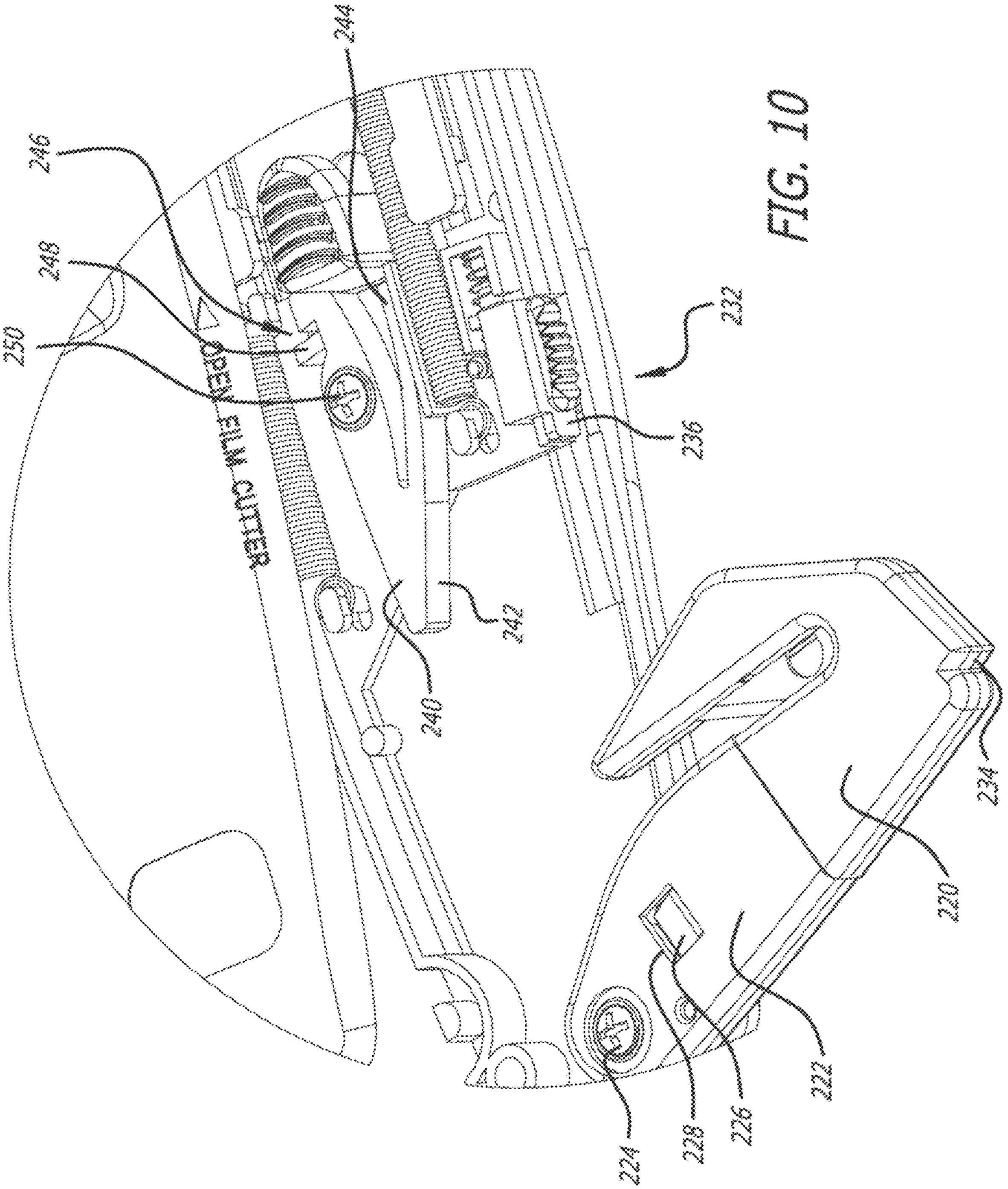
FIG. 10 is a perspective detail showing engagement of a front blade lockout mechanism when the detachable film cutter is deployed as shown in FIG. 9.

Referring to FIGS. 9 and 10, the cutter apparatus 100 also includes an auxiliary tool configured to be deployable from a back end of the housing 102. In this example embodiment, the auxiliary tool is a film cutter 220 which is detachably secured to an auxiliary tool receptacle 222 which is pivotally secured (by pivot axis 224) to the backbone structure 110. The film cutter 220 includes latch member 226 or the like which snap fits into a complementary recess 228 in the auxiliary tool receptacle 222.

In this example embodiment, the cutter apparatus 100 includes a coil spring 230 (FIG. 3) biased to deploy the auxiliary tool (e.g., the film cutter 220), and a tool latching/releasing device 232 configured to contact a complementary surface 234 of the auxiliary tool for securing the auxiliary tool within the housing and to be actuated by a user of the cutter apparatus to release the auxiliary tool. In this example embodiment, tool latching/releasing device 232 includes a tab 236 that is spring biased toward the complementary surface 234 to prevent the coil spring 230 from ejecting the auxiliary tool from the housing 102.

Figure 11:
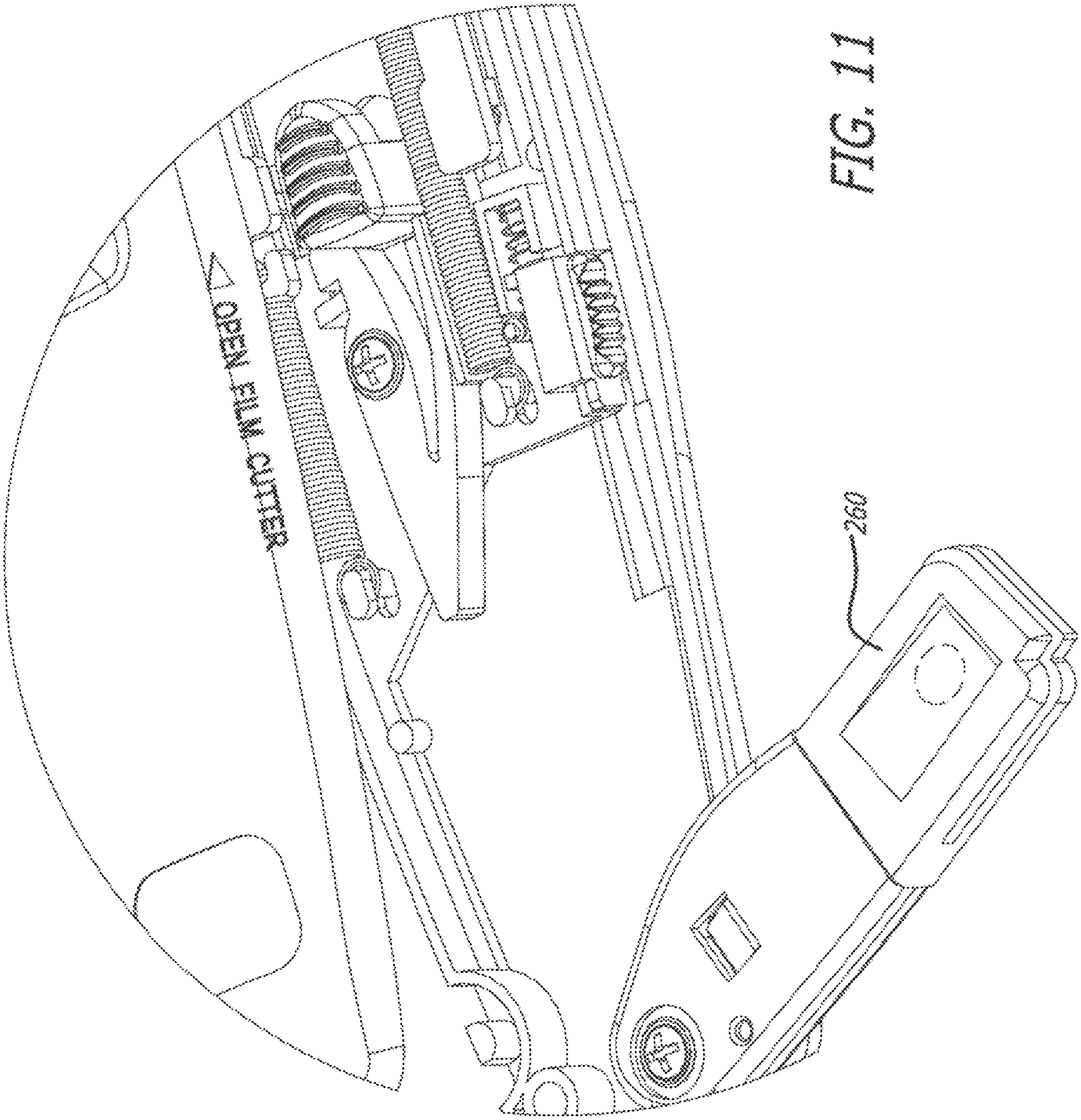
FIG. 11 is a perspective view of an alternate cutter apparatus as in FIG. 9, where the detachable film cutter is replaced with a detachable hole puncher.
Figure 12:
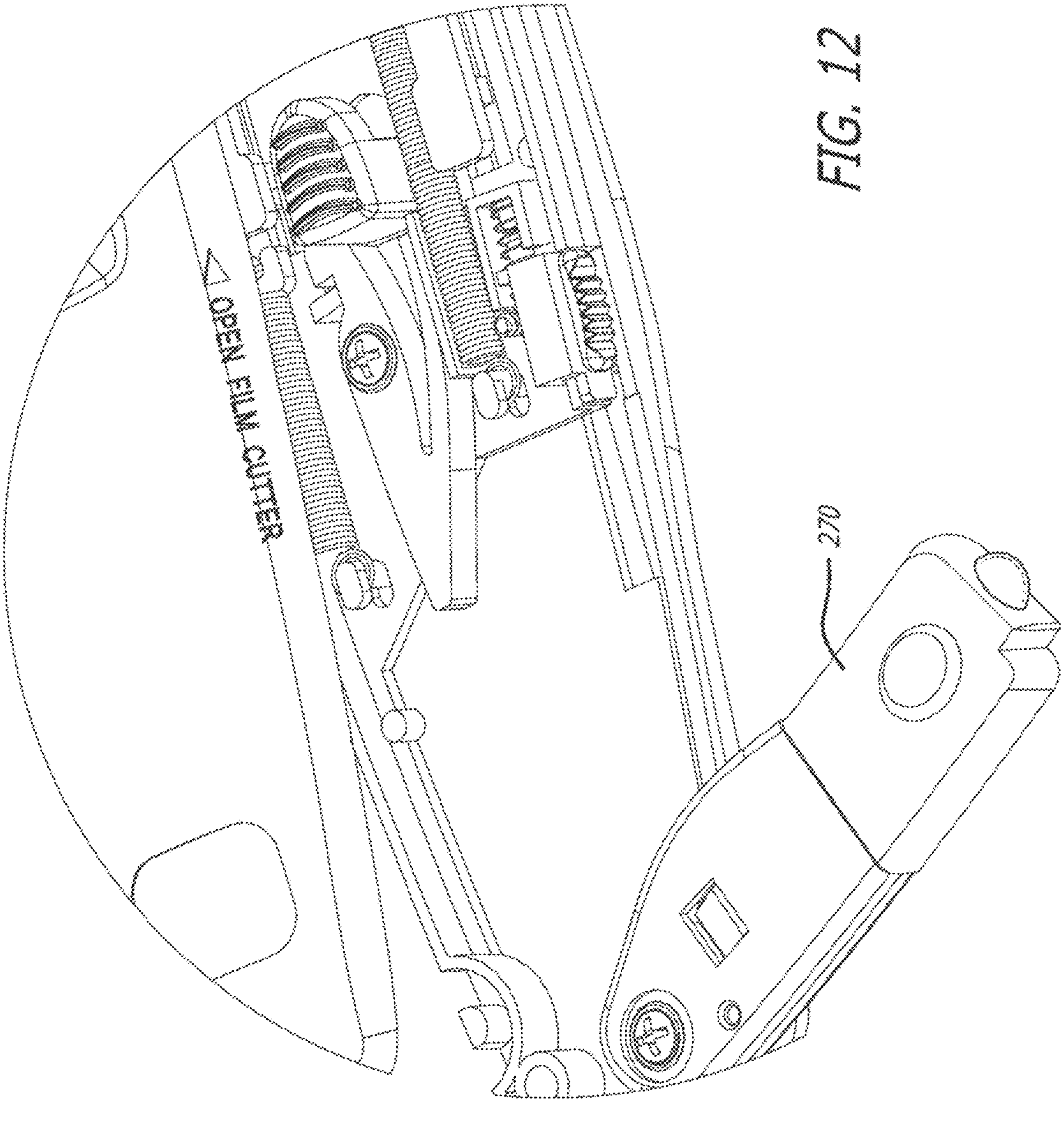
FIG. 12 is a perspective view of an alternate cutter apparatus as in FIG. 9, where the detachable film cutter is replaced with a detachable button-actuated light.

Referring to FIG. 10, in this example embodiment, the cutter apparatus 100 also includes an interlock device 240 that prevents the slider 104 from being moved to extend the front blade 126 from the housing 102 while the auxiliary tool is deployed. In this example embodiment, when the film cutter 220 is secured within the housing 102, the film cutter 220 contacts a surface 242 of the interlock device 240. When the film cutter 220 is released from the housing 102, a spring portion 244 of the interlock device 240 forces a notched portion 246 of the interlock device 240 to engage with an interlock hook 248 of the slider 104. In this example embodiment, the interlock device 240 is pivotally secured (by pivot axis 250) to the backbone structure 110. Thus, the interlock device 240 functions as a front blade lockout mechanism when the film cutter 220 or other auxiliary tool is deployed. Additional examples of auxiliary tools include a detachable hole puncher 260 (FIG. 11) and a detachable button-actuated light 270 (FIG. 12), such as a LED that is powered by a small battery located inside the auxiliary tool.

Figure 6:
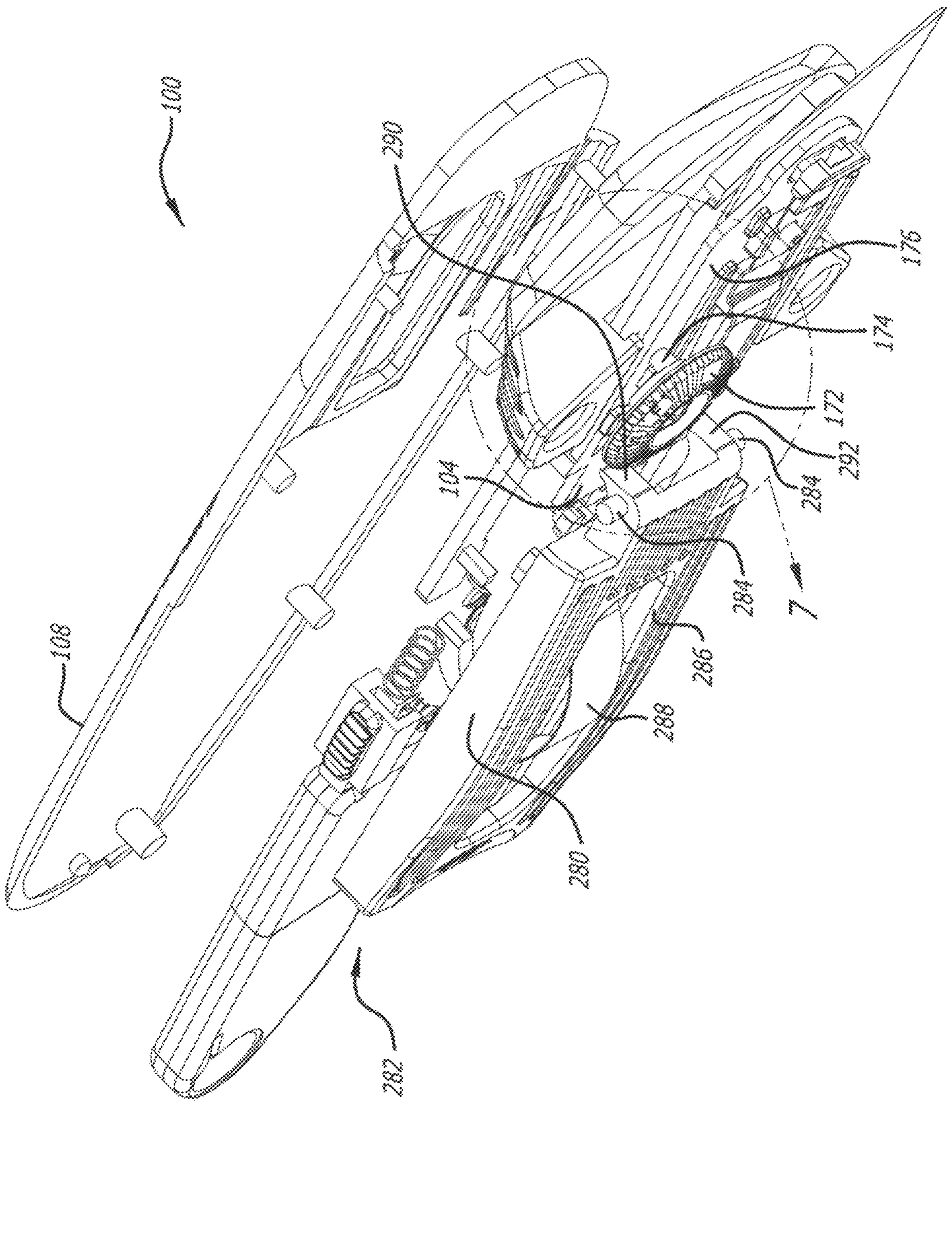
FIG. 6 is a partially exploded perspective view of the cutter apparatus of FIG. 1.
Figure 7:
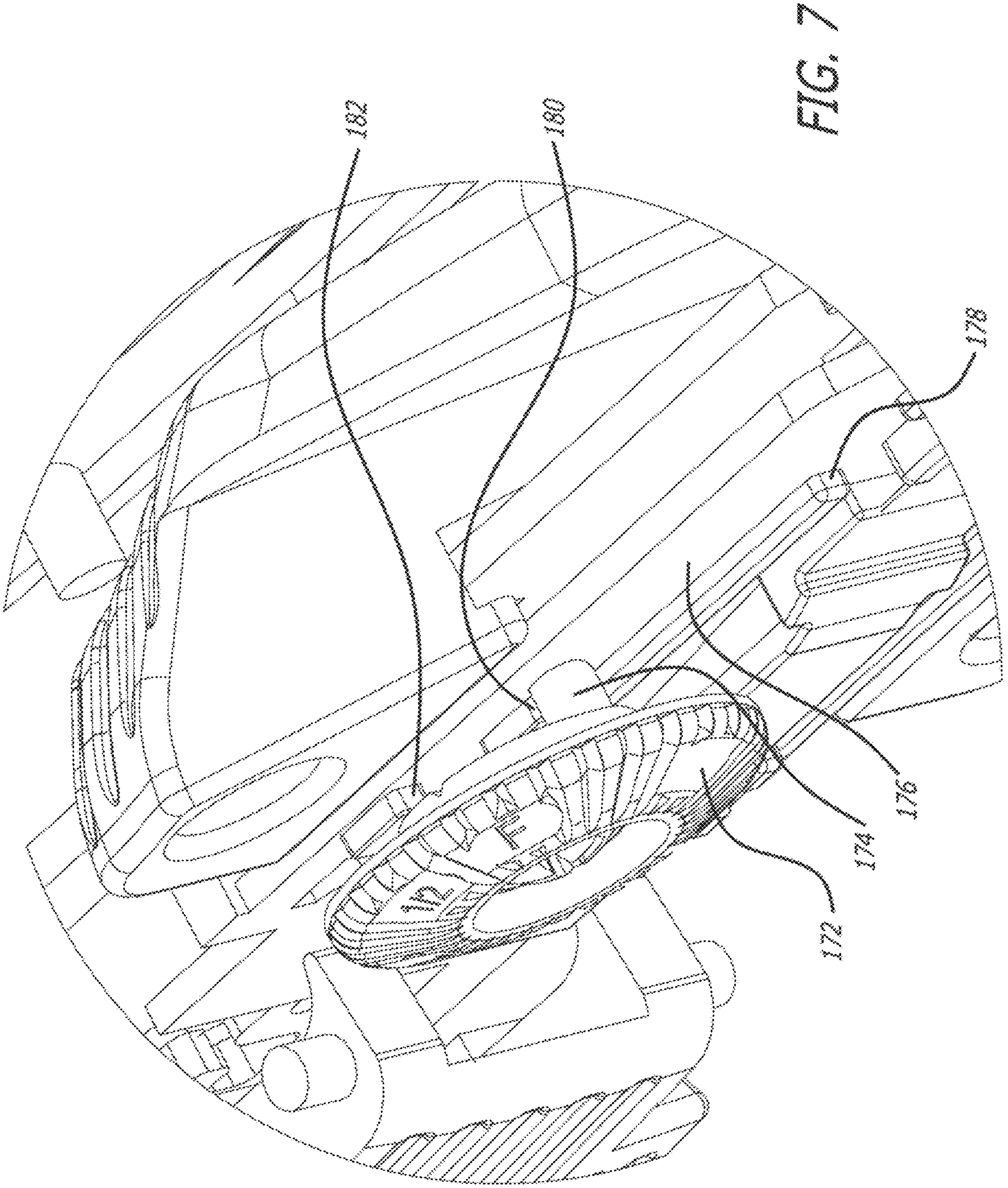
FIG. 7 is a perspective view showing the dial depth stop mechanism of FIG. 6 in detail.

Referring to FIGS. 3 and 6, in this example embodiment, the cutter apparatus 100 includes an enclosure 280 sized to hold spare blades (e.g., five spare blades). The enclosure 280 includes an end opening 282 for putting blades into and removing blades from the enclosure 280 and is pivotally secured as shown (via pivot axis 284) to the housing 102 and releasable from a secured position therein such that the end opening 282 is no longer positioned within the housing 102. The enclosure 280 includes a longitudinal window 286 for allowing a user to slide a spare blade out of the enclosure. In this example embodiment, the enclosure 280 is spring biased as shown by a spring 288 toward a spare blade dispensing position. In this example embodiment, the enclosure 280 is pivotally secured such that its range of pivoting motion is substantially limited (by contact of members 290, 292 with the slider 104) to only permit sufficient movement of the enclosure 280 to withdraw the end opening 282 from the housing 102.

Figure 14:
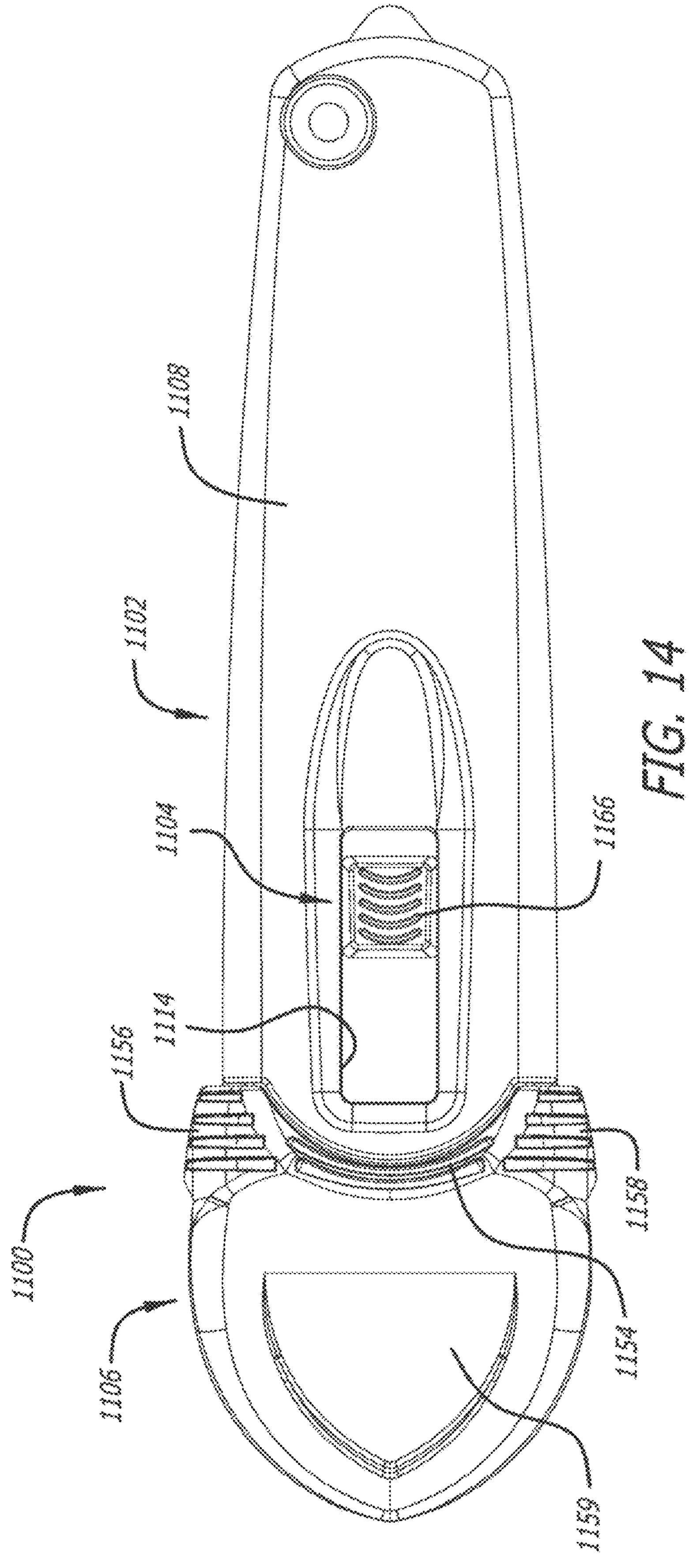
FIG. 14 is a top view of another example embodiment of a cutter apparatus.
Figure 15:
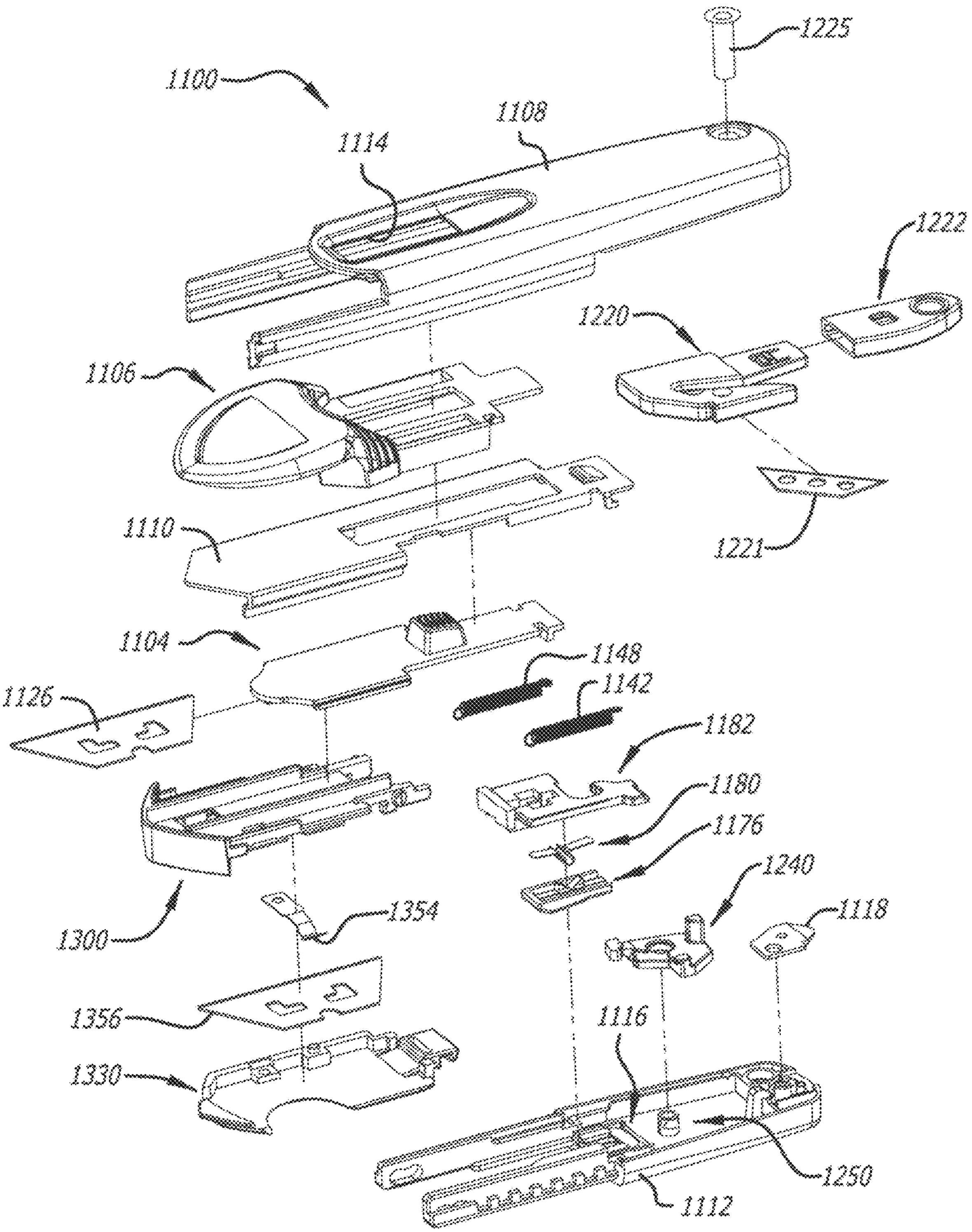
FIG. 15 is an exploded perspective view of the cutter apparatus of FIG. 14.
Figure 28:
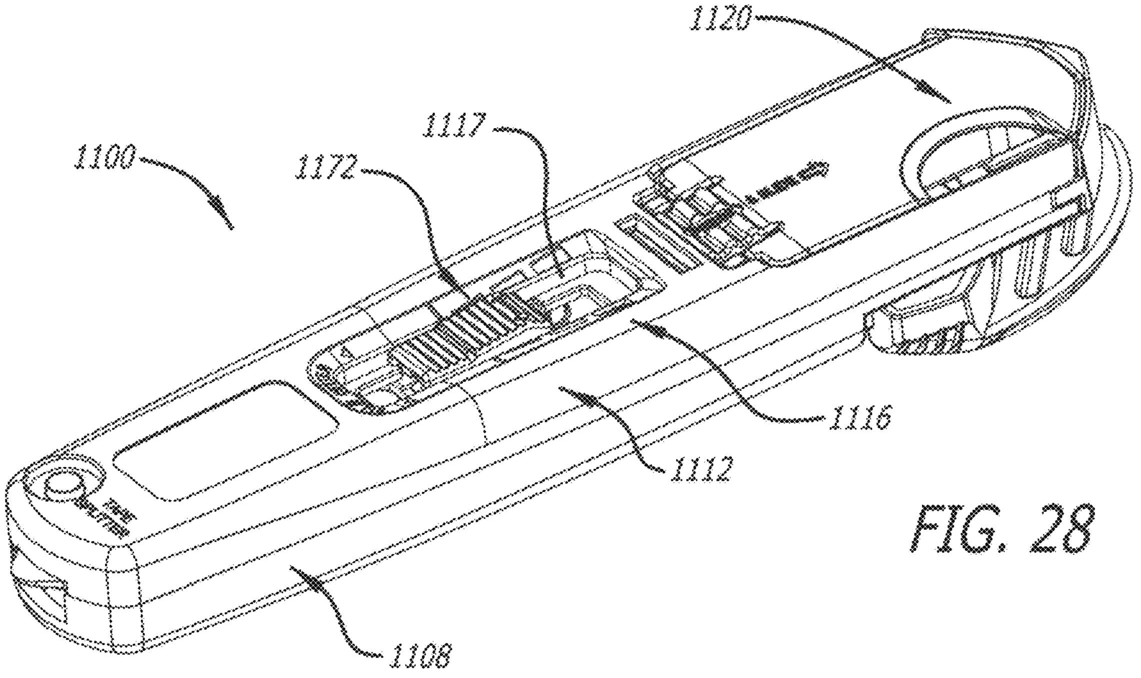
FIG. 28 is a perspective view of the cutter apparatus of FIG. 14 showing the selector at a blade depth (or cutting depth) selection position.

In example embodiments described herein, a cutter (or cutter apparatus) includes a mechanism or device that facilitates guard-actuated deployment of a blade from the cutter and also deployment of the blade independently of the guard. Referring to FIGS. 14 and 15, in this example embodiment, a cutter apparatus 1100 includes a housing 1102 a slider (or blade holder) 1104, a blade guard 1106 (which also functions as a cutting guide), and a channel structure 1110. The slider (or blade holder) 1104 and the blade guard 1106 can be formed of various materials, for example, a zinc alloy (e.g., Zamak 2), and by various processes (e.g., die cast). In this example embodiment, the housing 1102 includes an upper housing portion 1108 and a lower housing portion 1112 formed (e.g., as shown) to facilitate being interfitted together during assembly with the channel structure 1110 secured inside the housing 1102. The upper housing portion 1108 includes a slider window 1114, and the lower housing portion 1112 includes a selector window 1116. (See also FIG. 28.) The upper housing portion 1108 and the lower housing portion 1112 can be formed of various materials, for example, a thermoplastic that has high strength, rigidity, and impact resistance (e.g., Acrylonitrile butadiene styrene (ABS)), and by various processes (e.g., injection molding). The channel structure 1110 can be formed of various materials, for example, a material made of or including a metal (or a metal alloy or a plastic) that has high strength and wear resistance (e.g., cold rolled galvanized steel), and by various processes (e.g., progressive die stamped).

Figure 16:
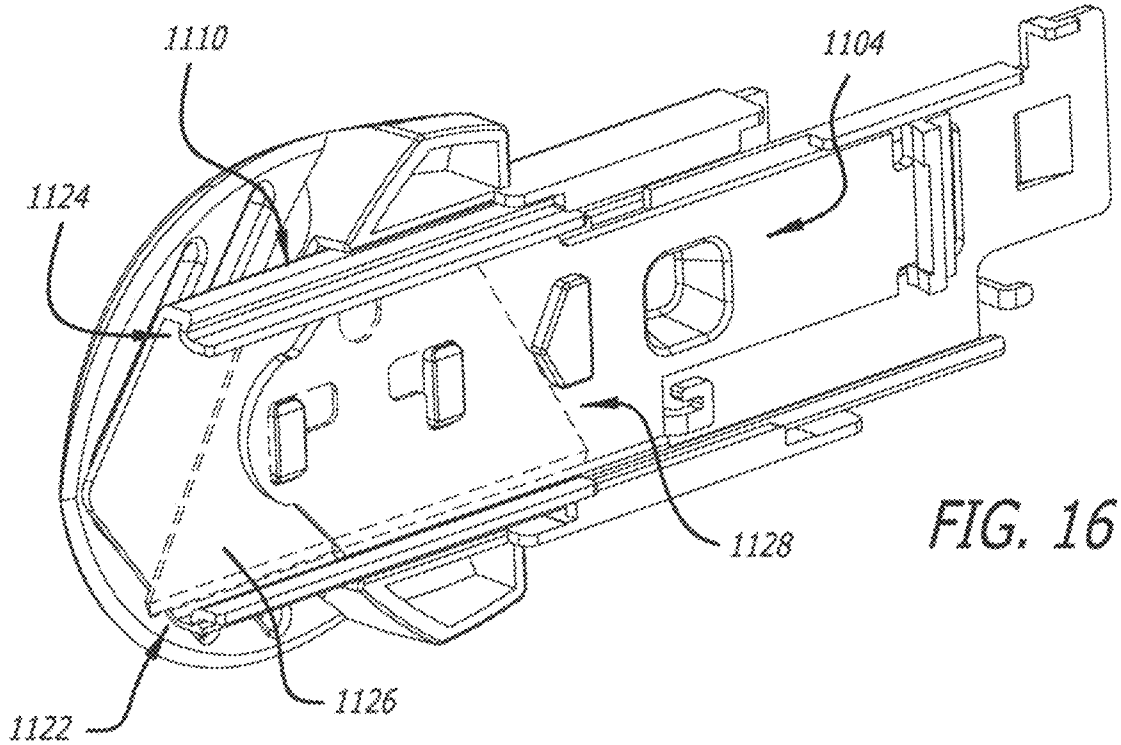
FIG. 16 is a perspective view showing the blade carrier/activation button and guard interface of the cutter apparatus of FIG. 14.
Figure 17:
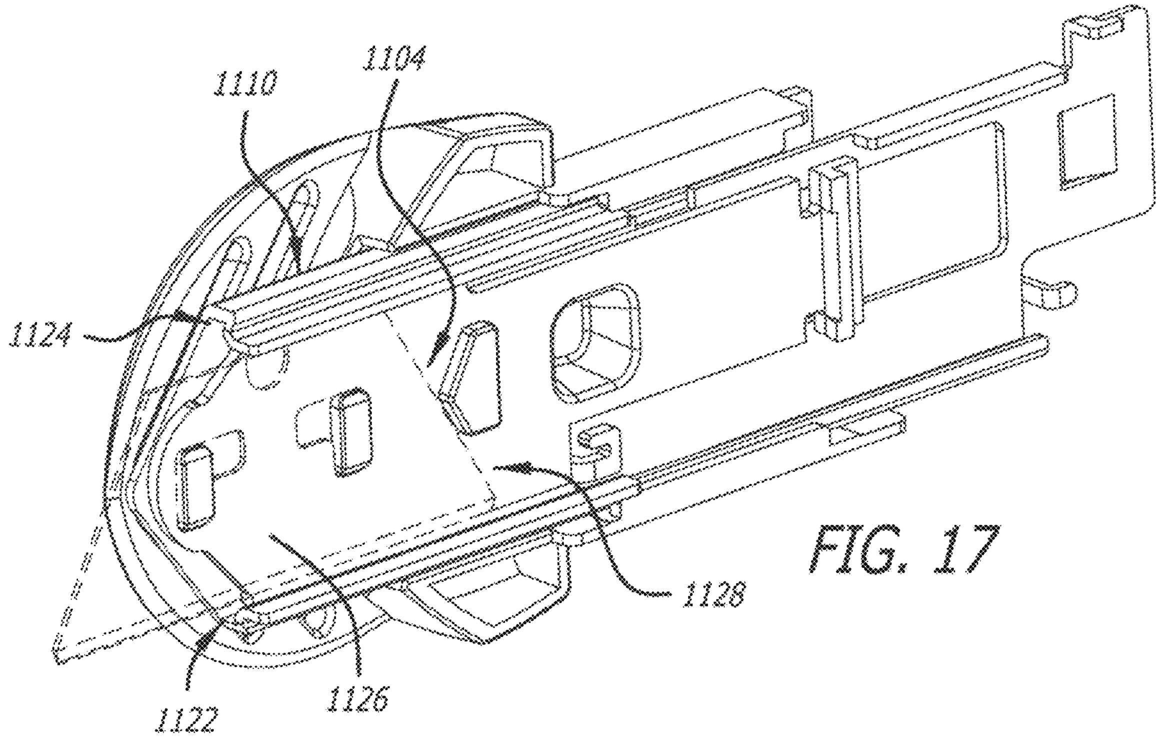
FIG. 17 shows the blade carrier/activation button repositioned distally along the interface (of FIG. 16) to a deployed position.
Figure 25A:
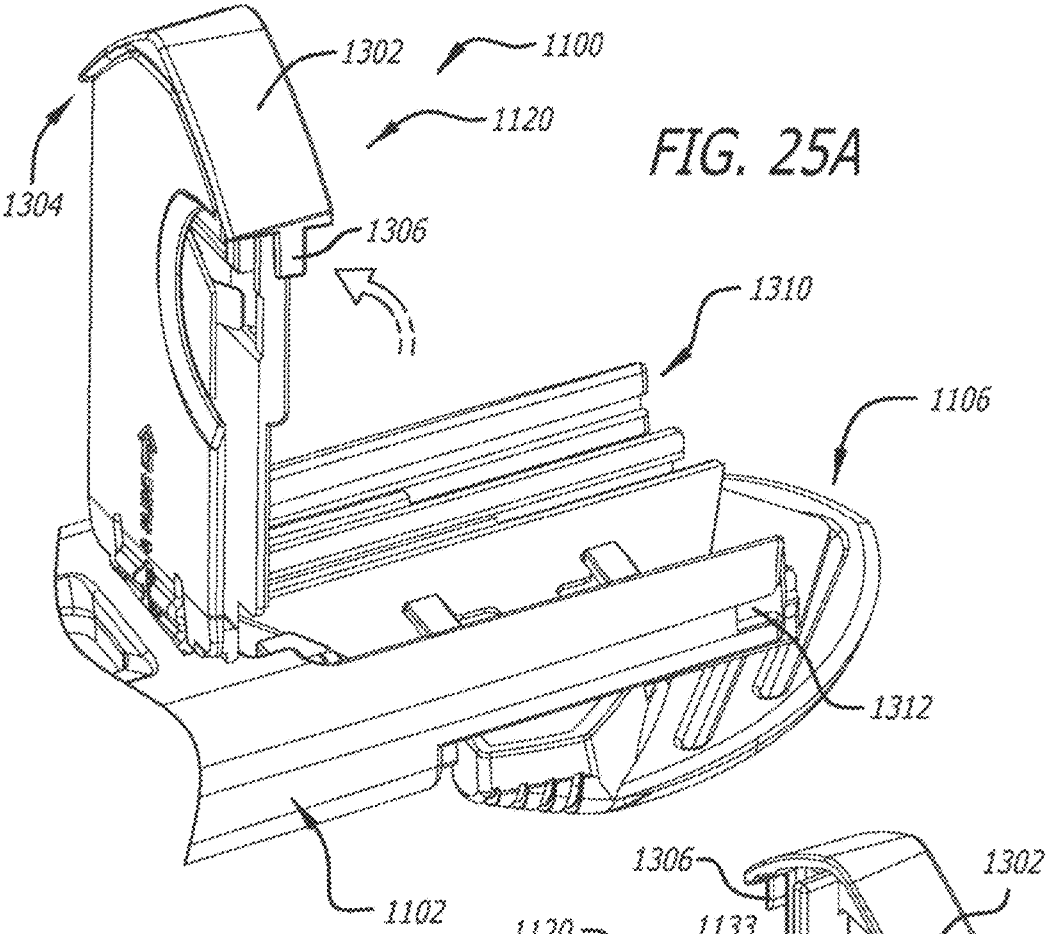
FIGS. 25A and 25B are different perspective views showing the blade storage compartment of the cutter apparatus of FIG. 14 pivoted away from the cutter housing to gain access to the blade storage compartment and/or facilitate a blade change operation.
Figure 25B:
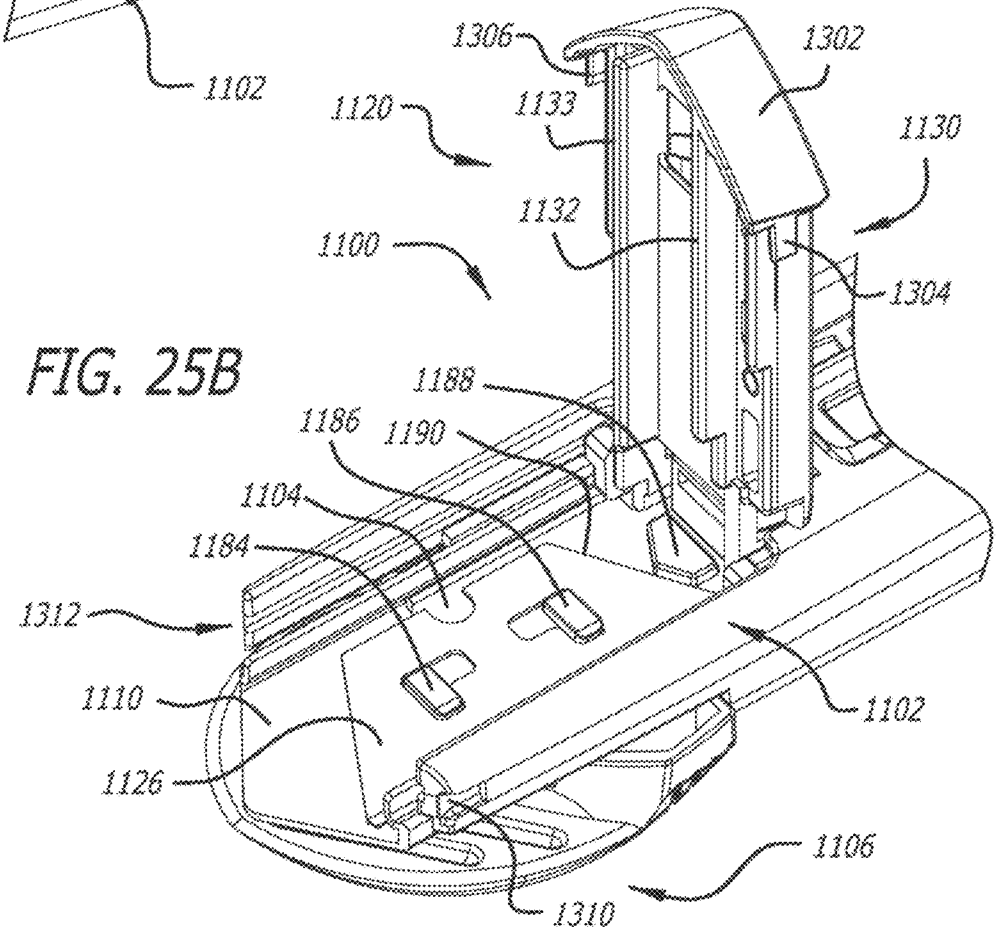

Referring also to FIGS. 16 and 17, in this example embodiment, the channel structure 1110 includes guide portions 1122 and 1124 which support the slider 1104 at side (or edge) portions thereof such that the slider 1104 is repositionable along the housing 1102. A front blade 1126 (shown in dashed lines) is supported by a bottom surface 1128 of the slider 1104. Referring additionally to FIG. 25B, the cutter apparatus 1100 includes a cover 1130 that is repositionable (e.g., pivotally) in relation to the housing 1102. In this example embodiment, the bottom surface 1128 (of the slider 1104) is substantially flat surface, and the slider (or blade holder) 1104 includes or is provided with protrusions 1184, 1186, and 1188 (e.g., fixed tabs or other raised structures shaped and positioned as shown) configured to accommodate positioning a blade (e.g., the front blade 1126) adjacent to the substantially flat surface with the protrusions extending through one or more apertures in the blade and engaging complementary surfaces of the blade preventing the blade from repositioning along the blade holder.

In example embodiments, the slider 1104 includes one or more symmetrical arranged support structures for the front blade 1126 which are configured such that at least one of the support structures faces an edge 1190 of the front blade 1126 when the blade is oriented for right-handed cutting, and at least one of the support structures faces the edge of the blade when the blade is oriented for left-handed cutting. In this example embodiment, the cover 1130 includes one or more blade stabilizing structures (e.g., a pair of rails 1132 and 1133, symmetrically arranged, as shown) that position adjacent to the blade when the cover is in a closed position. In example embodiments, one or more of the protrusions (of the blade holder) position between the stabilizing structures when the cover is moved to its closed position. In this example embodiment, the protrusions 1184 and 1186 position between the rails 1132 and 1133 when the cover is in its closed position. Other support structures can be used to facilitate ambidextrous use of the cutter apparatus 1100 in respect to cutting with the front blade 1126.

Figure 18:
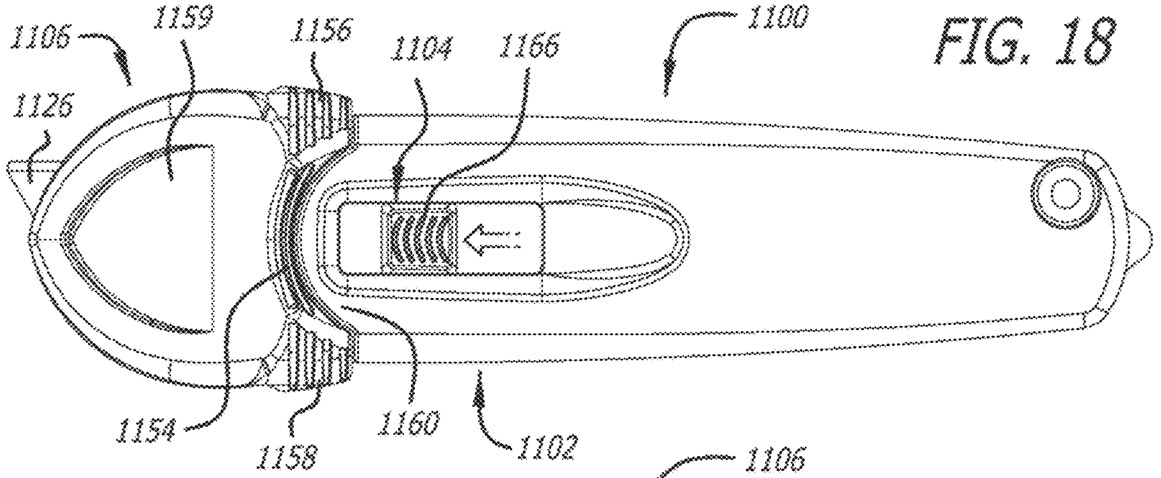
FIG. 18 is a top view of the cutter apparatus of FIG. 14 showing the blade repositioned to extend from the housing in response to the blade carrier/activation button being pushed toward the distal end of the cutter apparatus, the blade being activated independently of the blade guard.

Referring now to FIGS. 18, 18A, 19, 20, 21, and 22, in this example embodiment, the slider 1104 and the blade guard 1106 are configured such that the slider 1104 when pushed forward (as shown in FIG. 18) repositions independently of the blade guard 1106 (without being brought into contact with the blade guard 1106) to extend the front blade 1126 from the housing 1102 and such that the blade guard

Figure 20:
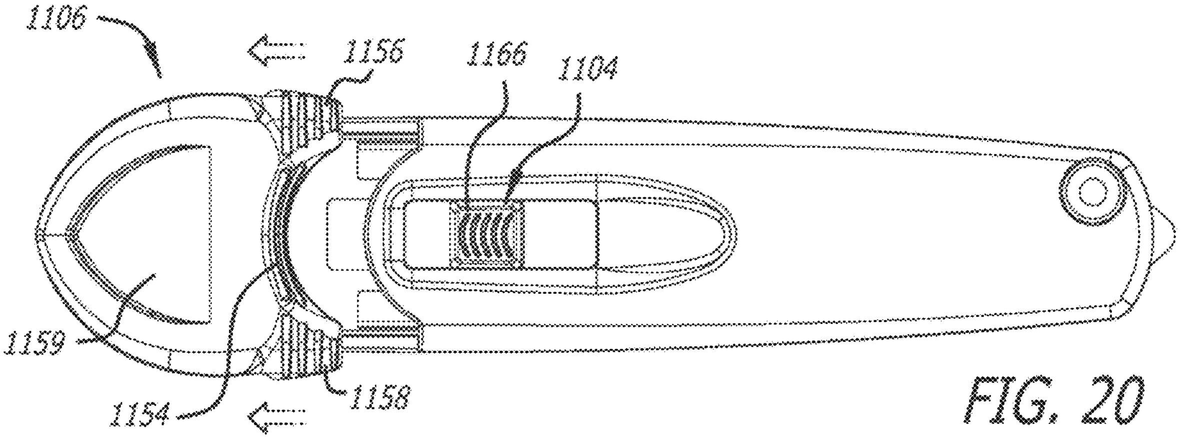
FIGS. 20 and 21 are top and perspective views, respectively, of the cutter apparatus of FIG. 14 showing the blade guard activated to a position determined (and limited) by the selected blade depth, the blade carrier/activation button being repositioned in tandem with the blade guard.
Figure 21:
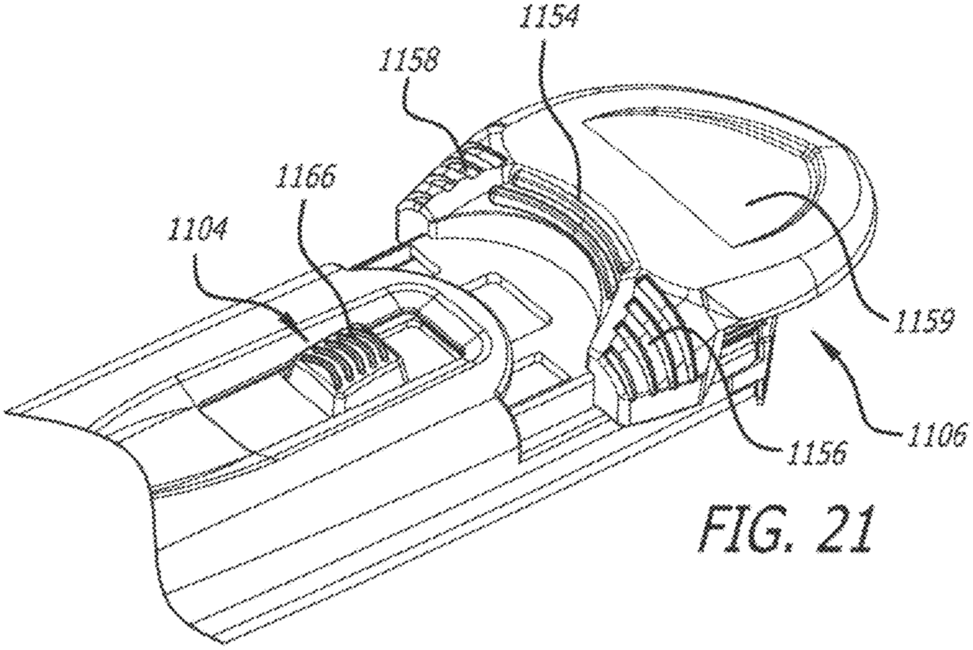

1106 when pushed forward (as shown in FIG. 20) repositions the front blade 1126 (causes the slider 1104 and the blade guard 1106 to move in tandem) as the blade guard 1106 is deployed. In this example embodiment, referring now to FIG. 19, the blade guard 1106 includes a portion 1134 (e.g., a distally-facing edge of an opening or other interior portion of the blade guard 1106) that makes contact with a portion 1138 (e.g., a proximally-facing surface) of the slider 1104 when the blade guard 1106 is slid forward; however, in contrast with the cutter apparatus 100 (previously described with reference to FIGS. 1-13E), the slider 1104 and the blade guard 1106 of the cutter apparatus 1100 are configured such that when the button 1166 of the slider 1104 is pushed forward the slider 1104 repositions without causing the blade guard 1106 to extend or deploy. The ability to extend the slider 1104 independent of the blade guard 1106 allows a user of the cutter apparatus 1100 to more conveniently gain access to the bottom surface 1128 (of the slider 1104) during a blade change operation.

Figure 18A:
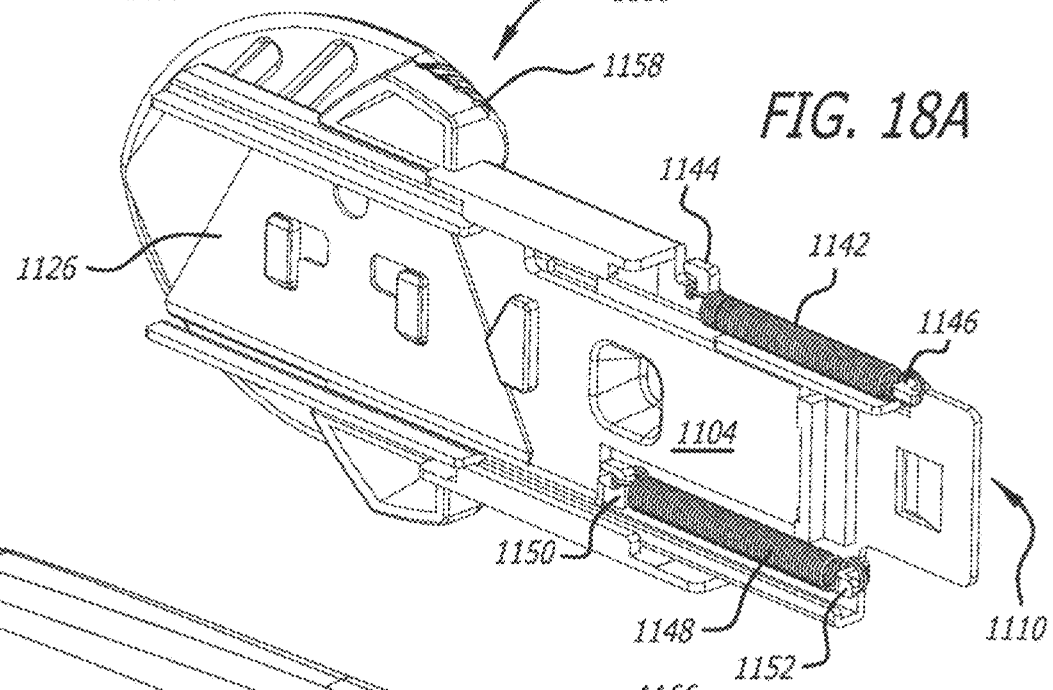
FIG. 18A is a perspective view of the cutter apparatus of FIG. 14 showing springs that bias the blade carrier/activation button and the blade guard, respectively.
Figure 19:
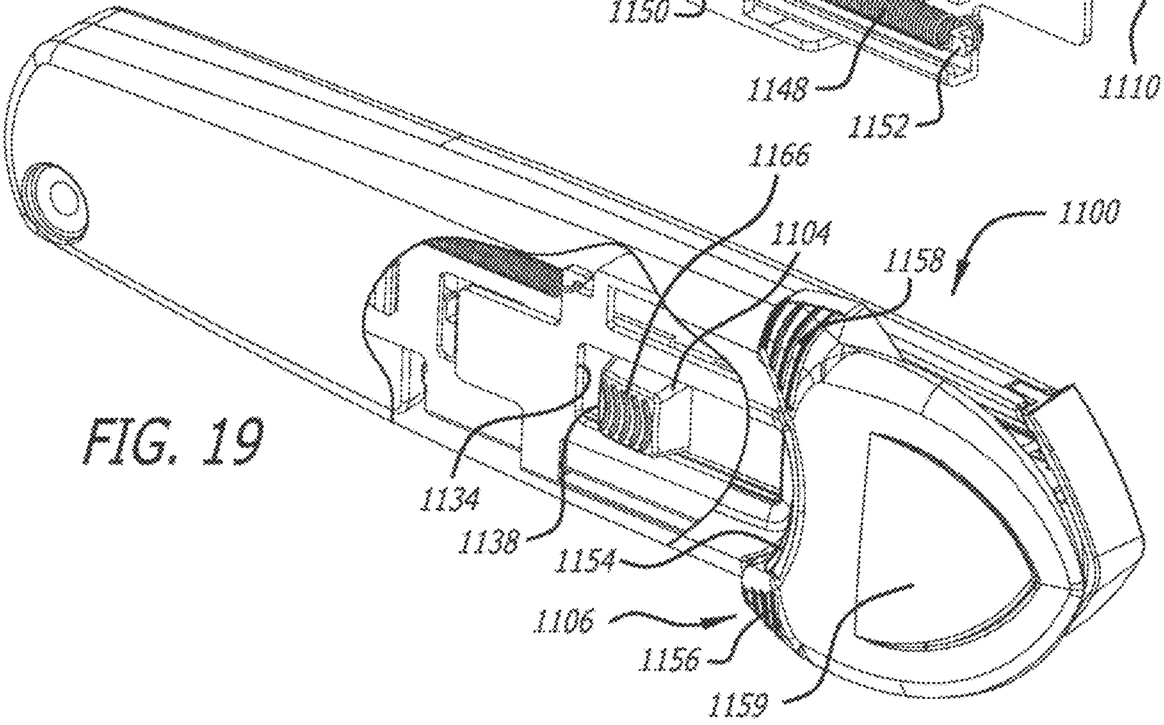
FIG. 19 is a perspective view of the cutter apparatus of FIG. 14 showing an internal portion of the blade guard that contacts the blade carrier/activation button when the blade guard is activated.

During activation of the blade guard 1106, force applied (by a user of the cutter apparatus 1100) to the blade guard 1106 overcomes a counterbias applied by a guard return spring 1142, which is secured as shown in FIG. 18A between a retention hook 1144 (of the blade guard 1106) and a post 1146 (of the channel structure 1110). This force also must overcome a counterbias applied by a slider return spring 1148, which is secured between a post 1150 (of the slider 1104) and a post 1152 of the channel structure 1110).

In this example embodiment, the blade guard 1106 includes one or more ergonomically designed surfaces or portions for pushing the blade guard 1106 forward. In this example embodiment, the blade guard 1106 includes a center grip portion 1154 and two adjacent side grip portions 1156 and 1158 (e.g., formed as shown). The center grip portion 1154 is narrower and steeper than the center grip portion 154 (of the cutter apparatus 100) and extends above a top surface 1160 of the housing 1102, and the blade guard 1106 and its side grip portions 1156 and 1158 extend slightly wider than the housing 1102. In this example embodiment, the blade guard 1106 includes a recessed portion 1159 at a distal end thereof, the recessed portion 1159 being sized to receive and engage a thumb placed on the distal end (of the blade guard). When the slider 1104 is activated by pushing its button 1166, the force applied (by a user of the cutter apparatus 1100) to the slider 1104 acts against the counterbias applied by the slider return spring 1148. In this example embodiment, the blade guard 1106 and the slider 1104 are independently spring biased.

Thus, in an example embodiment, a cutter (or cutter apparatus) includes a housing shaped to be hand-held, a slider configured to support a front blade, the slider being mechanically coupled to the housing and configured to be moved longitudinally along the housing, and a blade guard mechanically coupled to the housing and configured to be extended and retracted adjacent to the front end of the housing. The slider and the blade guard are configured such that the slider when pushed forward repositions independently of the blade guard to extend the front blade from the housing and such that the blade guard when pushed forward repositions the front blade as the blade guard is deployed.

In example embodiments, a cutter (or cutter apparatus) includes or is provided with multiple actuators for extending a blade from the cutter housing. The actuators can include, by way of example, a safety actuator that drives (or overrides) at least one of the other actuators while the safety actuator repositions (in relation to the housing) to extend the blade. In example embodiments, the safety actuator is provided in the form of a blade guard (e.g., a blade guard that is mechanically coupled to the housing and configured to be extended and retracted adjacent to the housing), and the blade guard drives a slider configured to support the blade.

Referring again to FIGS. 20 and 21, in this example embodiment, the blade guard 1106 serves as a safety actuator that drives another actuator, i.e., the slider 1104, while the blade guard 1106 repositions to extend the blade 1126 supported by the slider 1104.

In this example embodiment, the safety actuator (the blade guard 1106) drives an actuator (the slider 1104) that is located on the same side of the housing as the safety actuator. In this example embodiment, the safety actuator (the blade guard 1106) is distally located in relation to the slider 1104.

Thus, in an example embodiment, a cutter (or cutter apparatus) includes a housing (e.g., shaped to be hand-held), a blade holder configured to support a blade, and multiple actuators for extending the blade from the housing, the actuators including a safety actuator that drives at least one of the other actuators while repositioning to extend the blade. In example embodiments, the multiple actuators include an actuator (e.g., a slider) that is repositionable without driving the safety actuator to extend the blade from the housing.

Figure 22:
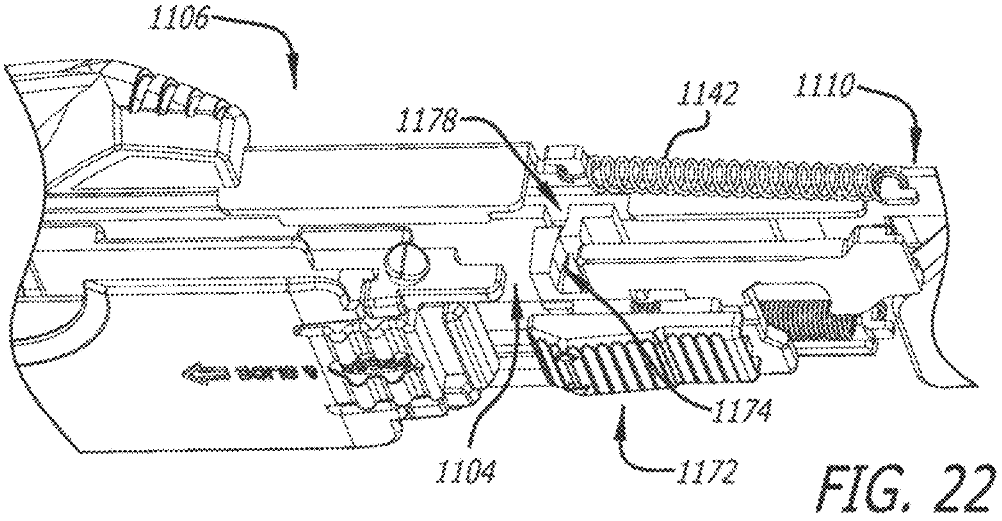
FIG. 22 is a perspective view showing a selector of the cutter apparatus of FIG. 14 that is repositionable to set a maximum blade depth, the selector including a portion that engages a complementary portion of the blade carrier/activation button preventing deployment of the blade beyond the maximum blade depth selected.

In example embodiments, a cutter (or cutter apparatus) includes or is provided with a selector (e.g., a switch or a button) repositionable in relation to the cutter housing and configured for setting a maximum blade depth to which the cutter blade is extendable from the housing. Referring to FIG. 22, in this example embodiment, the cutter apparatus 1100 includes a blade depth selector 1172 (discussed below), and the slider 1104 and the blade depth selector 1172 are configured such that a portion 1174 (e.g., a stop surface) of the blade depth selector 1172 engages a portion 1178 (e.g., an engagement surface) of the slider 1104 when the blade repositions to the maximum blade depth.

In example embodiments, a cutter (or cutter apparatus) includes a housing and a blade holder, and the housing includes a distal portion that is both slidably and pivotally coupled to the housing and configured to serve as a cover for the blade holder. In example embodiments, the cover includes a compartment (e.g., a spare blade storage compartment). Referring to FIGS. 23, 24, 25A, 25B, 26 and 27, in this example embodiment, the housing 1102 (of the cutter apparatus 1100) includes a distal portion 1120 that is configured to serve as a cover for the blade holder (i.e., the slider 1104). The distal portion (or cover) 1120 is configured to be repositionable between a locked position (FIG. 23) at which the cover is secured to the housing adjacent to and facing the blade holder and a released position (FIG. 24) at which at least a portion of the cover is free to pivotally reposition away from the housing (FIGS. 25A and 25B) providing access to the blade holder. The distal portion (or cover) 1120 includes a base 1300 with a distal end portion 1302 and tabs 1304 and 1306 (e.g., provided as shown). The base 1300 can be formed of various materials, for example, a zinc alloy (e.g., Zamak 2), and by various processes (e.g., die cast).

The distal portion (or cover) 1120 and the housing 1102 include complementary portions that engage (e.g., mutually engage) when the cover is in its locked position. In this example embodiment, the housing 1102 includes slots 1310 and 1312 configured to slidably receive and engage with the tabs 1304 and 1306, respectively, for securing the distal portion (or cover) 1120 in its locked position. Accordingly, in example embodiments, a cutter (or cutter apparatus) includes a cover and a housing that are configured such that the cover is only repositionable along a path (or plane) parallel to a surface of the blade holder (e.g., a surface adjacent to the side of the blade facing away from the cover) when the cover is moving between locked and released positions.

Figure 24:
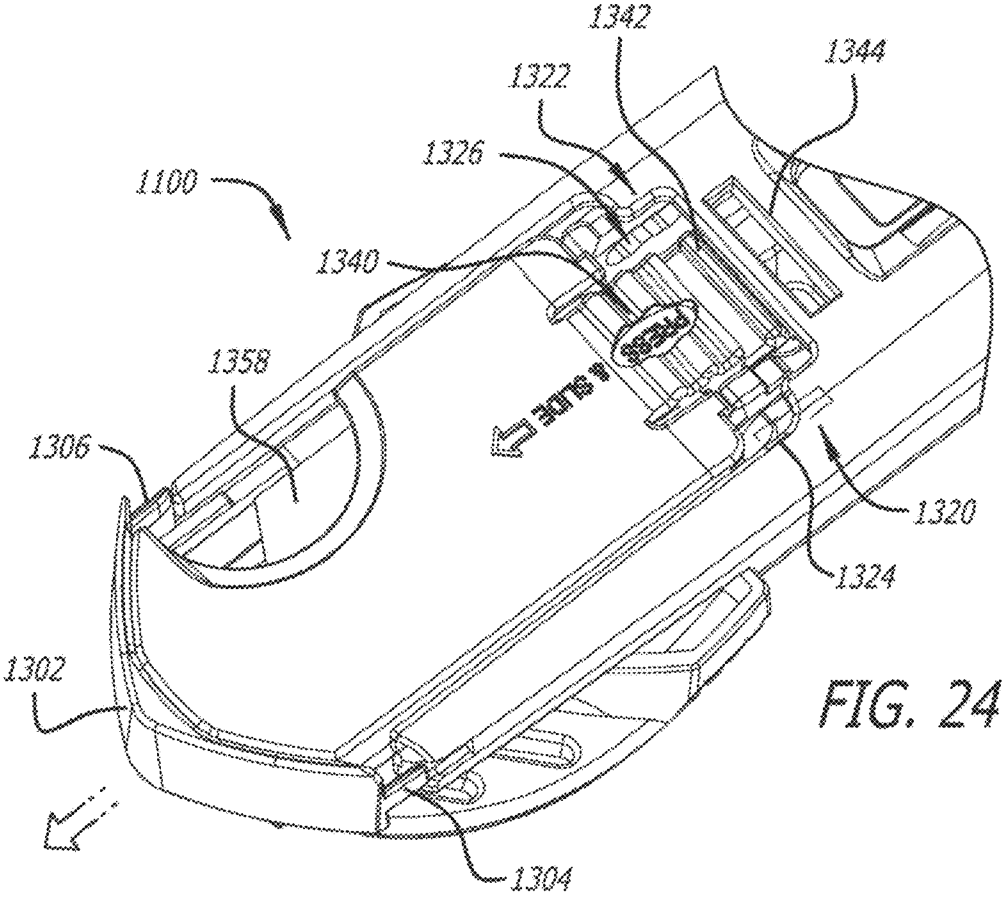
Figure 26:
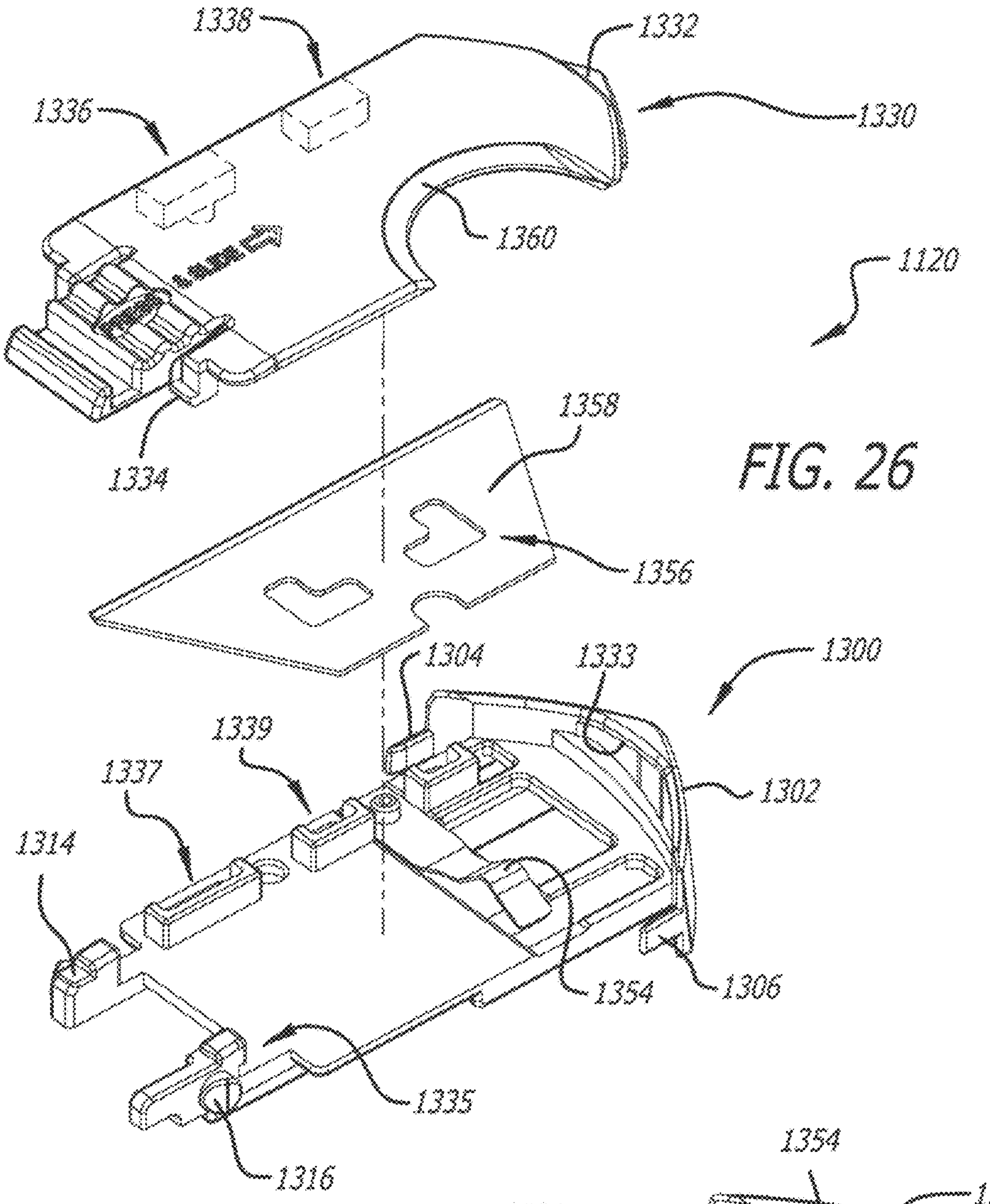
FIG. 26 is an exploded perspective view of the blade storage compartment of the cutter apparatus of FIG. 14.

Referring to FIG. 26, the base 1300 includes pivot posts 1314 and 1316 (e.g., formed as shown) at opposing sides thereof. In this example embodiment, and referring also to FIG. 24, the pivot posts 1314 and 1316 reposition longitudinally along guide channels 1320 and 1322 (of the housing 1102), respectively, as the distal portion (or cover) 1120 moves between its locked position and its released position. In FIG. 24, the guide channel 1320 is shown in dashed lines, and the portion of base 1300 that includes the pivot post 1314 is not shown so that the guide channel 1322 can be seen. In this example embodiment, the guide channels 1320 and 1322 (of the housing 1102) include portions 1324 and 1326, respectively. The portions 1324 and 1326 are configured (e.g., as shown) to receive the pivot posts 1314 and 1316, respectively, when the distal portion (or cover) 1120 is moved to its released position (at which the distal-most portion of the cover extends slightly beyond the distal-most portion of the blade guard when the blade guard is in its fully retracted position). Accordingly, in example embodiments, the cover includes or is coupled to one or more pivot (or bearing) elements that are received by one or more complementary portions of the housing when the cover is moved (e.g., repositioned longitudinally) to its released position.

Thus, in an example embodiment, a cutter (or cutter apparatus) includes a housing and a blade holder coupled to the housing, the housing including a distal portion that is both slidably and pivotally coupled to portions of the housing and configured to serve as a cover for the blade holder. In example embodiments, the blade holder includes or is coupled or connected to a blade carrier that is repositionable in relation to the housing (independent of whether the cover is in its locked position or its released position). In example embodiments, the cover is repositionable in relation to the housing independent of the blade carrier. In example embodiments, the blade carrier includes or is coupled or connected to an actuator (e.g., a slider) that is repositionable in relation to the housing. In example embodiments, the cutter (or cutter apparatus) further includes a blade guard mechanically coupled to the housing and configured to be extended and retracted adjacent to the front end of the housing, wherein the actuator and the blade guard are configured such that the actuator when pushed forward repositions independently of the blade guard (without being brought into contact with the blade guard) to extend a (front) blade (held on the blade carrier) from the housing. The actuator and the blade guard are configured to move in tandem as the blade guard is deployed, the actuator being contacted and pushed forward to extend the front blade from the housing in response to the blade guard being pushed forward.

The distal portion (or cover) 1120 includes a top portion 1330 that is secured to the base portion 1300. Referring to FIG. 26, in this example embodiment, the top portion 1300 includes portions 1332, 1334, 1336, and 1338 which are interfitted with complementary portions 1333, 1335, 1337, and 1339 (of the base portion 1300), respectively. The top portion 1330 can be formed of various materials, for example, a thermoplastic that has high stiffness, creep resistance, low warpage, and high dimensional stability (e.g., Polyoxymethylene (POM), Glass Filled), and by various processes (e.g., injection molding).

In example embodiments, a cutter (or cutter apparatus) includes a cover release device configured to facilitate repositioning a cover between a locked position at which the cover is secured to the cutter housing and a released position at which at least a portion of the cover is free to pivotally reposition away from the housing providing access to a blade holder. In example embodiments, the cover release device includes a flexible portion configured to reposition in relation to the housing.

Figure 23:
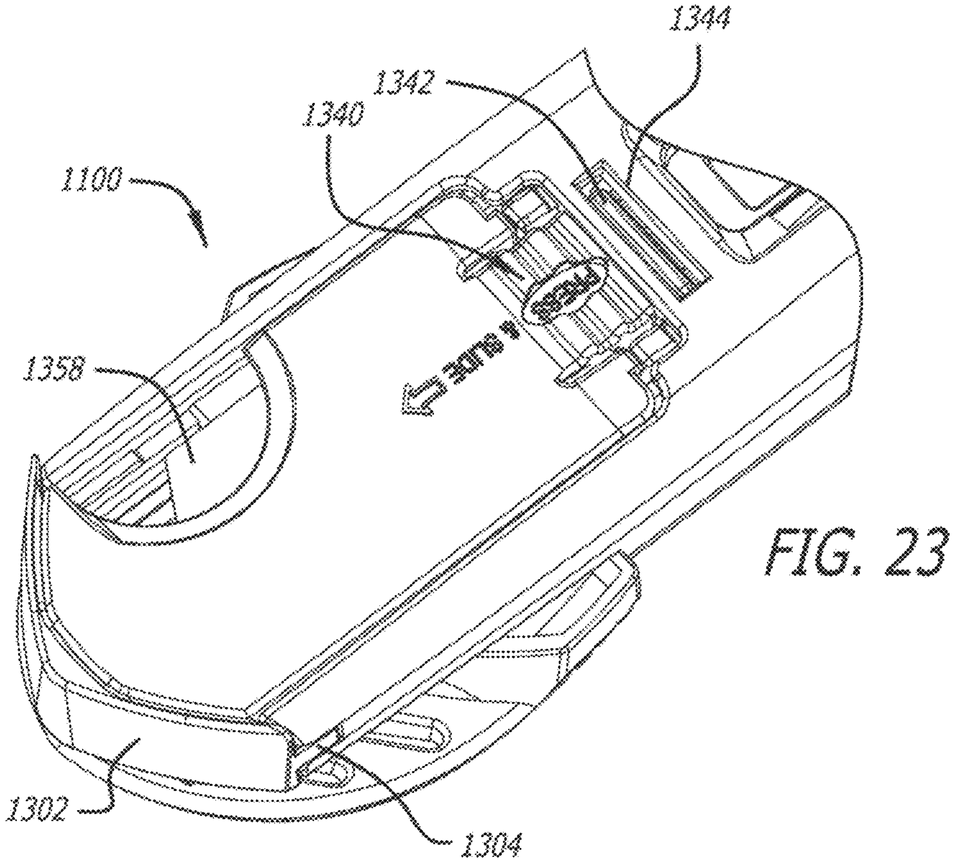
FIGS. 23 and 24 are perspective views of a blade storage compartment of the cutter apparatus of FIG. 14 shown in its locked position and released position, respectively.

In example embodiments, the distal portion (or cover) 1120 includes or is provided with a cover release device configured to facilitate repositioning the cover between its locked position and its released position. For example, the cover release device and the housing include complementary portions that mutually engage when the cover is in its locked position. Referring to FIGS. 23 and 24, in this example embodiment, a cover release device 1340 (e.g., a flexible portion of the cover) includes an engagement member 1342 that interfits with a recess 1344 of the housing 1102 when the cover is in its locked position. The cover release device 1340 is configured, for example, to be (inwardly) repositionable in relation to (a portion of) the housing 1102. In example embodiments, the cover release device is coupled (e.g., directly or indirectly coupled) to the cover (or integrally formed therewith) and configured to allow a user of the cutter apparatus to reposition the cover to its released position. In example embodiments, at least a portion of the cover release device is repositionable between portions of the cover that are coupled (e.g., slidably coupled) to the housing. For example, referring to FIG. 24, when the cover release device 1340 is depressed inwardly, a portion thereof repositions between the pivot posts 1314 and 1316 (of the base 1300).

Thus, in an example embodiment, a cutter (or cutter apparatus) includes a housing, a blade holder coupled to the housing, a cover for the blade holder, the cover being coupled to and repositionable in relation to the housing, and a cover release device configured to facilitate repositioning the cover between a locked position at which the cover is secured to the housing and a released position at which at least a portion of the cover is free to pivotally reposition away from the housing providing access to the blade holder. In example embodiments, the cover is located at the distal end of the cutter apparatus and/or includes a compartment (e.g., a spare blade storage compartment). In example embodiments, the blade holder includes or is coupled or connected to a blade carrier that is repositionable in relation to the housing (independent of whether the cover is in its locked position or its released position). In example embodiments, the cover is repositionable in relation to the housing independent of the blade carrier. In example embodiments, the blade carrier includes or is coupled or connected to an actuator (e.g., a slider) that is repositionable in relation to the housing. In example embodiments, the cutter (or cutter apparatus) further includes a blade guard mechanically coupled to the housing and configured to be extended and retracted adjacent to the front end of the housing, wherein the actuator and the blade guard are configured such that the actuator when pushed forward repositions independently of the blade guard (without being brought into contact with the blade guard) to extend a (front) blade (held on the blade carrier) from the housing. The actuator and the blade guard are configured to move in tandem as the blade guard is deployed, the actuator being contacted and pushed forward to extend the front blade from the housing in response to the blade guard being pushed forward.

Figure 27:
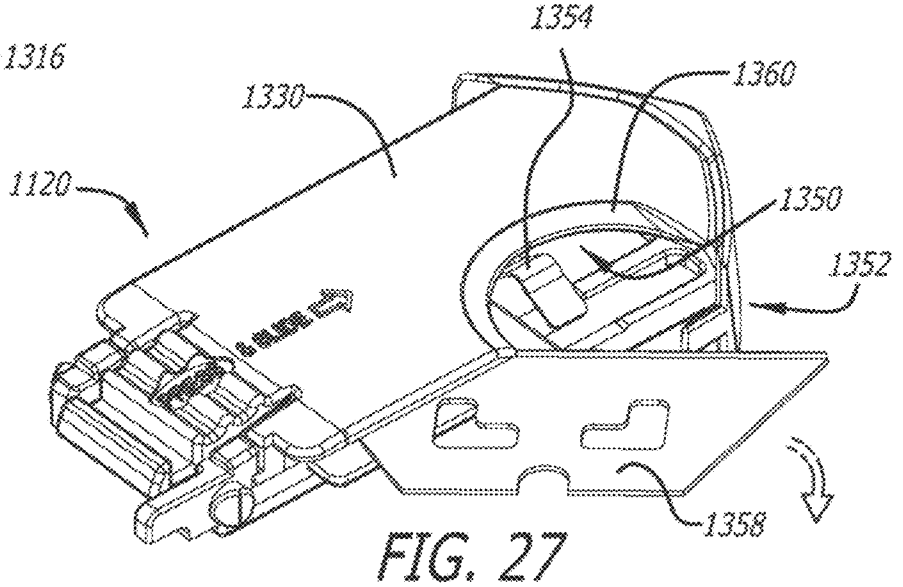
FIG. 27 is a perspective view of the blade storage compartment of the cutter apparatus of FIG. 14 showing a blade being withdrawn from the blade storage compartment.

In example embodiments, a cutter (or cutter apparatus) includes a blade holder and a blade storage compartment that is a cover for the blade holder. Referring to FIGS. 26 and 27, in this example embodiment, the distal portion (or cover) 1120 includes a blade storage compartment 1350 with a side opening 1352 that is accessible for withdrawing a blade therefrom (only) when the cover is pivoted away from the housing. The blade storage compartment 1350 is sized and configured, for example, to hold five replacement blades therein and includes or is provided with a spring 1354 (e.g., a steel leaf spring) that interfaces with a cutout 1356 on a replacement blade 1358. In this example embodiment, the top portion 1330 of the cover includes an opening 1360 (e.g., defined by a beveled recessed edge as shown) configured to allow a user of the cutter apparatus to withdraw (e.g., slide) a blade from the blade storage compartment 1350 via the side opening 1352. Thus, in an example embodiment, a cutter (or cutter apparatus) includes a housing, a blade holder coupled to the housing, and a blade storage compartment configured to serve as a cover for the blade holder. In example embodiments, the blade storage compartment is located at the distal end of the cutter apparatus. In example embodiments, the blade holder includes or is coupled or connected to a blade carrier that is repositionable in relation to the housing (independent of whether the cover is in its locked position or its released position). In example embodiments, the cover is repositionable in relation to the housing independent of the blade carrier. In example embodiments, the blade carrier includes or is coupled or connected to an actuator (e.g., a slider) that is repositionable in relation to the housing. In example embodiments, the cutter (or cutter apparatus) further includes a blade guard mechanically coupled to the housing and configured to be extended and retracted adjacent to the front end of the housing, wherein the actuator and the blade guard are configured such that the actuator when pushed forward repositions independently of the blade guard (without being brought into contact with the blade guard) to extend a (front) blade (held on the blade carrier) from the housing. The actuator and the blade guard are configured to move in tandem as the blade guard is deployed, the actuator being contacted and pushed forward to extend the front blade from the housing in response to the blade guard being pushed forward.

Although example embodiments of cutters (or cutter apparatuses) described herein include a blade carrier (or blade holder) that is configured to be repositionable (e.g., in relation to the cutter housing), the scope of the present invention(s) additionally includes and/or contemplates cutters (or cutter apparatuses) with a blade holder that is coupled to the housing, but not repositionable (e.g., a fixed blade).

Referring now to FIGS. 28-32, in this example embodiment, the blade depth selector 1172 includes an upper button 1176, a spring 1180, and a lower button 1182 (e.g., formed as shown). The upper button 1176 can be formed of various materials, for example, a thermoplastic that has high stiffness, creep resistance, low warpage, and high dimensional stability (e.g., Polyoxymethylene (POM), Glass Filled), and by various processes (e.g., injection molding). The spring 1180 (e.g., a leaf spring) can be formed of various materials, for example, a material made of or including a metal (or a metal alloy or a plastic) that has high strength and wear resistance (e.g., stainless steel), and by various processes (e.g., progressive die stamping). The lower button 1182 can be formed of various materials, for example, a thermoplastic that has high strength, rigidity, and impact resistance (e.g., Polycarbonate (PC)), and by various processes (e.g., injection molding).

Figure 29:
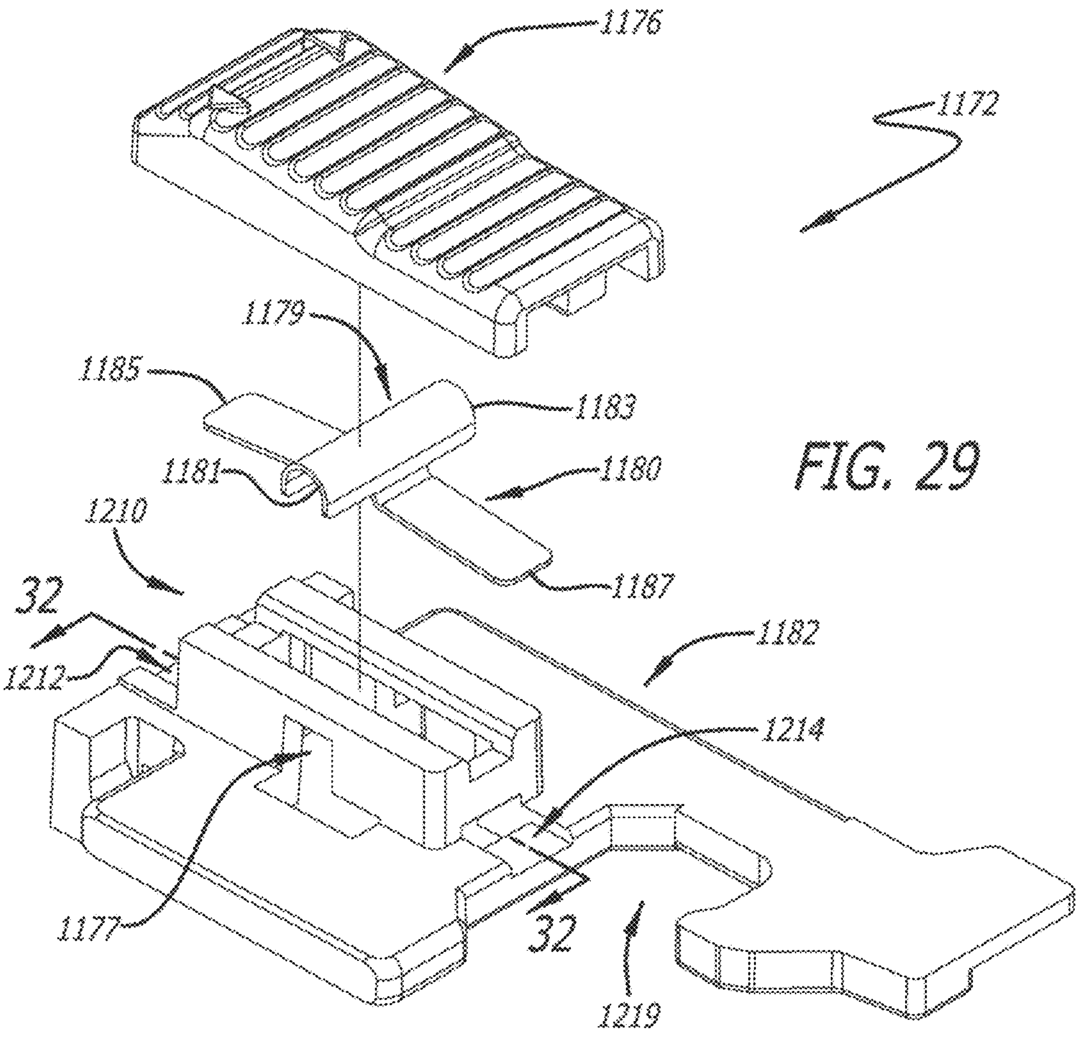
FIG. 29 is an exploded perspective view of the selector of the cutter apparatus of FIG. 14, the selector including an upper button, a spring with engagement portions, and a lower button.
Figure 30:
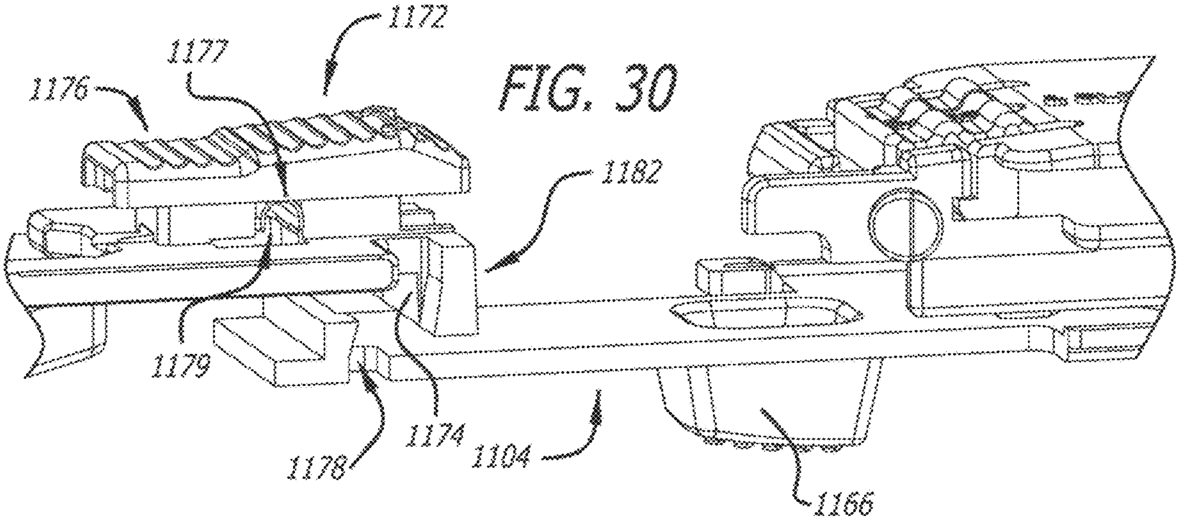
FIG. 30 is a perspective view showing portions of the selector and the blade activation slider of the cutter apparatus of FIG. 14 that come into contact with each other preventing the blade activation slider from repositioning further than permitted for the blade depth selected.
Figure 31:
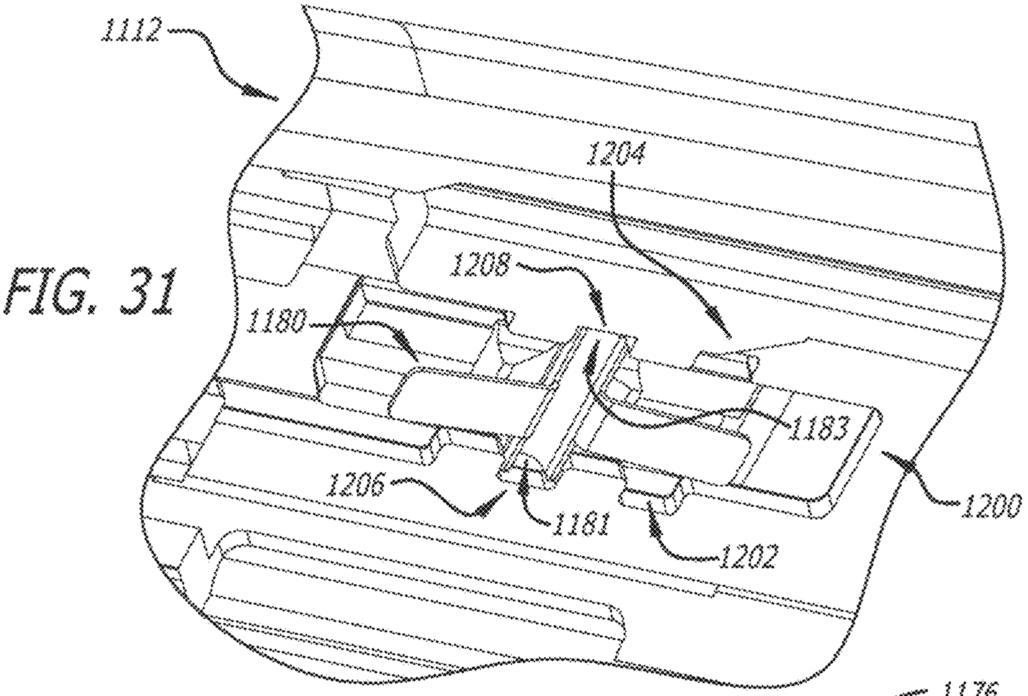
FIG. 31 is a perspective view showing the upper button of the selector held in place in a blade depth selection position, the engagement portions (of the selector spring) being biased upward toward and positioned within opposing recessed portions of the housing.
Figure 32:
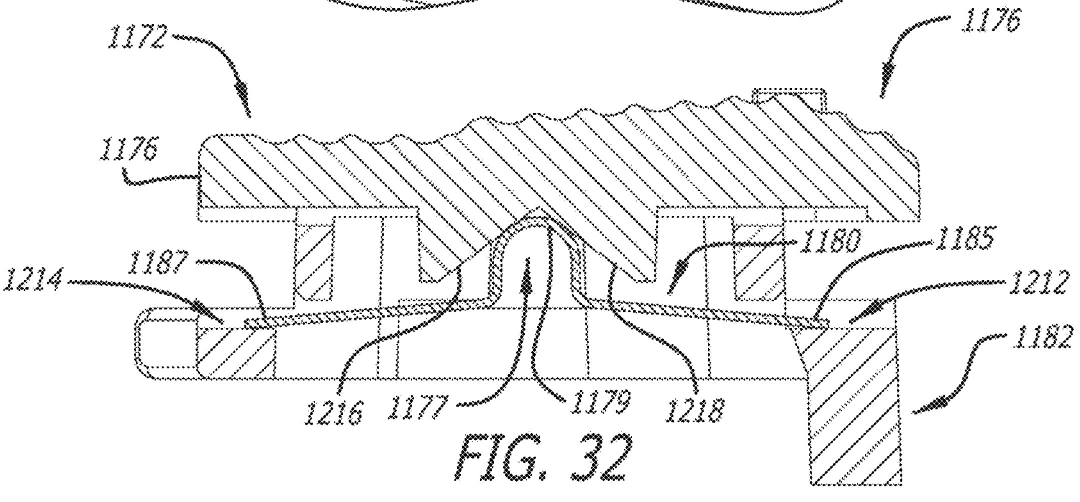
FIG. 32 is a cross-sectional view of the selector of the cutter apparatus of FIG. 14 showing a ramp on the upper button that causes the spring to depress in response to sliding the upper button forward or backward, allowing the upper button (switch) to disengage from the recessed portions of the housing and move to a different position.

The blade depth selector 1172 is configured to be repositionable along the selector window 1116 (of the lower housing portion 1112). In this example embodiment, and referring to FIG. 28, an inset peripheral portion 1117 (of the lower housing 1112) supports bottom edge portions of the upper button 1176 as it (the upper button 1176) is repositioned within the selector window 1116 and also prevents the upper button 1176 from being pressed inward in relation to the housing. Referring to FIGS. 29, 30, and 32, the spring 1180 includes a central portion 1179 that provides engagement portions 1181 and 1183. The lower button 1182 includes a recess 1177 configured to slidably receive the central portion 1179 (of the spring 1180). The spring 1180 includes contact portions 1185 and 1187 that bias the central portion 1179 (of the spring 1180) upward. The lower button 1182 includes a channel 1210 that interfaces with the upper button 1176, and surfaces 1212 and 1214 that support the contact portions 1185 and 1187 (of the spring 1180), respectively. Referring to FIG. 31, the lower housing portion 1112 is provides with a selector path 1200 that includes stop surfaces defined by sides of recessed portions 1202, 1204, 1206, and 1208. When the blade depth selector 1172 is at rest at a location corresponding to a selected blade depth, the central portion 1179 (of the spring 1180) is biased upward and the engagement portions 1181 and 1183 (of the spring 1180) are positioned within one of the opposing pairs of recesses. When the upper button 1176 is urged forward or backward, ramps 1216 and 1218 (of the upper button 1176) impart a counter-biasing force that pushes the central portion 1179 downward allowing the blade depth selector 1172 to reposition along the path 1200.

Thus, in an example embodiment, a cutter (or cutter apparatus) includes a housing, a blade carrier (or slider) configured to support a blade, the blade carrier being coupled to and repositionable in relation to the housing, and a selector (e.g., a switch or a button) repositionable in relation to the housing and configured for setting a maximum blade depth to which the blade is extendable from the housing, the selector including one or more engagement portions (e.g., a pair of opposing engagement elements) that are repositionable along a path and configured with a biasing component to selectively engage (one of a plurality of pairs of) stop surfaces (e.g., of the housing), the selector including a counter-biasing component configured to disengage the one or more engagement portions from the stop surfaces in response to a user of the cutter apparatus initiating an action of repositioning the selector along the path. In example embodiments, the biasing component includes a spring (e.g., a leaf spring) configured to bias the one or more engagement portions toward (e.g., laterally in relation to) the path. In example embodiments, the counter-biasing component includes a surface (e.g., an angled surface, such as a ramp) or other structure configured to depress the spring to disengage the one or more engagement portions from the stop surfaces in response to initiating an action of repositioning the selector along the path. In example embodiments, the blade carrier and the selector are configured such that a portion of the selector (e.g., the stop surface on the "lower button") engages a portion of the blade carrier when the front blade repositions to the maximum blade depth. In example embodiments, the blade carrier includes or is coupled or connected to an actuator (e.g., slider) that is repositionable in relation to the housing. In example embodiments, the actuator and the selector extend from different portions (e.g., opposite sides) of the housing.

Figure 33:
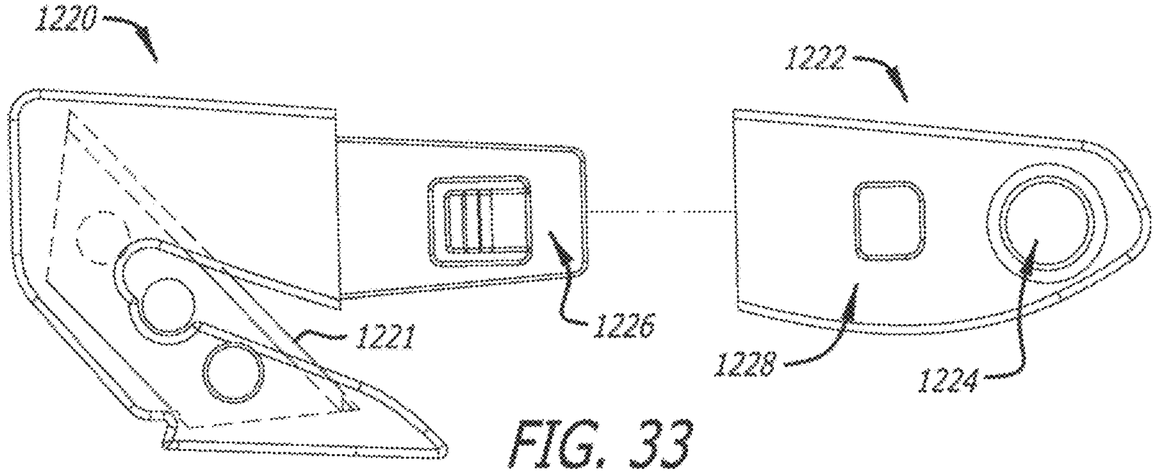
FIG. 33 is a side view of the film cutter of the cutter apparatus of FIG. 14, the film cutter including a replaceable cutter portion shown (in this figure) separated from its base portion.
Figure 34:
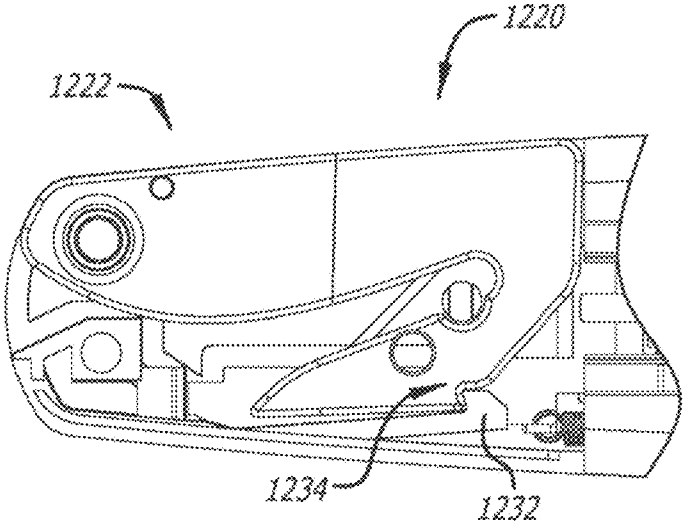
FIGS. 34 and 35 are cross-sectional side views of the cutter apparatus of FIG. 14 showing the film cutter secured by a latch inside the cutter housing and released from the latch, respectively.
Figure 35:
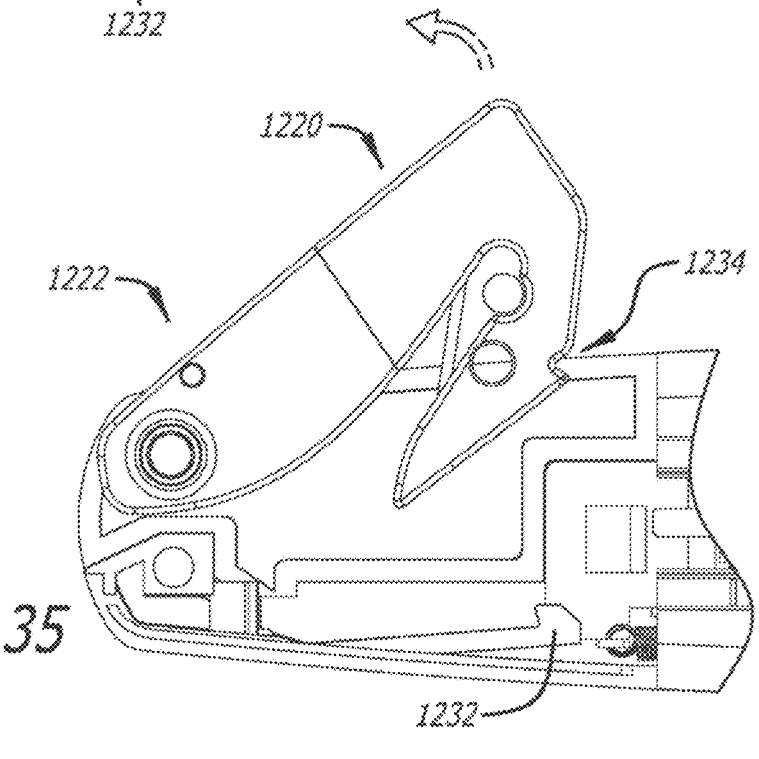

Referring to FIGS. 33-35, in this example embodiment, the cutter apparatus 1100 also includes an auxiliary tool configured to be deployable from a back end of the housing 1102. In this example embodiment, the auxiliary tool is a film cutter 1220 which is detachably secured to an auxiliary tool receptacle 1222 which is pivotally secured (by pivot axis 1224) to the housing 1102. The film cutter 1220 includes a blade 1221 and an insertion portion with a latch member 1226 or the like which snap fits into a complementary recess 1228 in the auxiliary tool receptacle 1222. The film cutter 1220 can be formed of various materials, for example, a thermoplastic that has high strength, rigidity, and impact resistance (e.g., Acrylonitrile butadiene styrene (ABS)), and by various processes (e.g., injection molding). The auxiliary tool receptacle 1222 can be formed of various materials, for example, a zinc alloy (e.g., Zamak 2), and by various processes (e.g., die cast).

In this example embodiment, the cutter apparatus 1100 includes a latch/spring member 1232 that engages a portion 1234 (e.g., a recess or other engagement surface or structure) of the film cutter 1220 for securing the cutter apparatus 1100 within the housing. In this example embodiment, the blade depth selector 1172 is utilized to activate (or deploy) the auxiliary tool.

Referring to FIGS. 36-39, in this example embodiment, the cutter apparatus 1100 includes an interlock device 1240, e.g., formed as shown, with lever portions 1244, 1246, and 1248 and pivotally secured by pivot axis 1250 to the housing 1102, and the blade depth selector 1172 is repositionable for activating the film cutter 1220. The interlock device 1240 (e.g., a lock wheel) can be formed of various materials, for example, a thermoplastic that has high stiffness, creep resistance, low warpage, and high dimensional stability (e.g., Polyoxymethylene (POM), Glass Filled), and by various processes (e.g., injection molding).

Referring to FIG. 36, the lower button 1182 includes a surface 1242 which is brought into contact with the lever portion 1244 of the interlock device 1240 when the blade depth selector 1172 is repositioned to an auxiliary tool deployment position (e.g., by sliding the upper button 1176 to its most proximal setting or position). Referring to FIG. 37, when the surface 1242 is pushed against the lever portion 1244, the interlock device 1240 rotates and its lever portion 1246 overcomes the latch/spring member 1232 releasing (i.e., activating) the film cutter 1220. When the auxiliary tool is activated, the lever portion 1248 is positioned as shown for engagement with a recess 1219 (or other engagement portion or structure) of the lower button 1182. Referring to FIG. 38, the film cutter 1220 once activated can be rotated to its fully extended (or cutting) position at which a protrusion 1252 (at base of the cutter) releasably interfits (e.g., detents) with a divot 1254 (on film cutter base/receptacle). With the film cutter 1220 activated, the lever portion 1248 prevents the blade depth selector 1172 from being used until, as shown in FIG. 39, the auxiliary tool receptacle 1222 is pushed back into the cutter housing and brought into contact with the lever portion 1246 causing the interlock device 1240 to rotate and disengage the lever portion 1248 from the lower button 1182.

Example embodiments of cutters (or cutter apparatuses) include a tape splitter located, for example, at a base portion of the cutter. Referring to FIGS. 40-43, in this example embodiment, the cutter apparatus 1100 includes a tape splitter 1118 which is sized and configured (e.g., protruding from the base of the housing 1102 and housed between cutter body portions as shown) to serve as a mechanism or device for splitting tape and/or other materials. The tape splitter 1118 includes an opening through which the aforementioned protrusion 1252 extends. The tape splitter 1118 can be formed of various materials, for example, a material made of or including a metal (or a metal alloy or a plastic) that has high strength and wear resistance (e.g., stainless steel), and by various processes (e.g., stamped).

Thus, in an example embodiment, a cutter (or cutter apparatus) includes a housing, a blade carrier configured to support a front blade, the blade carrier being coupled to and repositionable in relation to the housing, an auxiliary tool configured to be deployable from another portion (e.g., a back end) of the housing, and a selector (e.g., a switch or a button) repositionable in relation to the housing and configured for mutually exclusively facilitating the user-controlled actions of setting a maximum blade depth to which the front blade is extendable from the housing and activating (or deploying) the auxiliary tool.

In example embodiments, the auxiliary tool is a cutter (e.g., a film cutter). In example embodiments, the housing includes a spring (e.g., a plastic spring integrally formed at an inside portion of the housing) that engages a portion (e.g., a recess) of the auxiliary tool to lock the auxiliary tool in place when the auxiliary tool is pushed (back) into the housing. In example embodiments, the selector activates the auxiliary tool by disengaging the auxiliary tool from the spring (and pushing a portion of the auxiliary tool out of the housing).

In example embodiments, the selector includes an engagement portion (e.g., a recess or other surface in the lower button) that is engaged (e.g., by an interlock device) in response to activation of the auxiliary tool to prevent deployment of the front blade when the auxiliary tool is activated. The selector and/or the blade carrier can include surfaces (e.g., interfacing or stop surfaces) or other structures configured to prevent the blade carrier from being repositioned (to extend the front blade from the housing) while the engagement portion (of the selector) is engaged.

In example embodiments, the selector includes one or more engagement portions (e.g., a pair of opposing engagement elements) that are repositionable along a path and configured to selectively engage (one of a plurality of pairs of) stop surfaces (e.g., of the housing). In example embodiments, the selector includes or is provided with a spring (e.g., a leaf spring) configured to bias the one or more engagement portions toward (e.g., laterally in relation to) the path. The selector can include a surface (e.g., an angled surface, such as a ramp) or other structure configured to depress the spring to disengage the one or more engagement portions from the stop surfaces in response to initiating an action of repositioning the selector along the path.

In example embodiments, the selector includes a button (or other engagement portion) that extends from the housing, the selector being configured such that the button is repositionable along the housing between blade depth selection positions and an auxiliary tool activation position without repositioning the button inward in relation to the housing. In example embodiments, the selector and the housing are configured such that the button (of the blade depth selector) cannot be pushed into the housing or inward in relation to the housing.

In another example embodiment, a cutter (or cutter apparatus) includes a housing, a blade carrier configured to support a front blade, the blade carrier being coupled to and repositionable in relation to the housing, an auxiliary tool configured to be deployable from another portion (e.g., a back end) of the housing, and an interlock configured to prevent the blade carrier from being repositioned (to extend the front blade from the housing) while the auxiliary tool is activated, the interlock including a blade depth selector repositionable in relation to the housing for limiting a (maximum) blade depth to which the front blade is extendable from the housing and for activating the auxiliary tool. In example embodiments, the interlock includes a locking element or component (e.g., a rotatable lock wheel with a lever including a hook) that engages (a portion of) the blade depth selector when the auxiliary tool is activated. In example embodiments, the auxiliary tool and the interlock are configured such that the locking element or component disengages from the blade depth selector when the auxiliary tool is pushed (back) into the housing. In example embodiments, the housing includes a spring (e.g., a plastic spring integrally formed at an inside portion of the housing) that engages a portion (e.g., a recess) of the auxiliary tool to lock the auxiliary tool in place when the auxiliary tool is pushed (back) into the housing. In example embodiments, the blade depth selector activates the auxiliary tool by disengaging the auxiliary tool from the spring (and pushing a portion of the auxiliary tool out of the housing).

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A cutter apparatus comprising a housing having a first end and a second end;

a blade guard slidably received at the first end of the housing, the blade guard having a distal end that extends from the first end of the housing; and an actuator slidably received within the housing, the actuator being in mechanical communication with the blade guard;

wherein actuating either the actuator or the blade guard causes a blade to be extended from the first end of the housing;

wherein actuating the actuator independently of the blade guard enables a portion of the blade to be extended away from the first end of the housing beyond the distal end of the blade guard;

wherein actuating the blade guard extends the blade away from the first end of the housing without extending any portion of the blade beyond the distal end of the blade guard.

2. The cutter apparatus of claim 1, further comprising a button formed on the actuator, wherein the button extends through a window formed between the first end and the second end of the housing.

3. The cutter apparatus of claim 2, further comprising a channel formed in the blade guard, wherein the channel is configured to receive a portion of the button.

4. The cutter apparatus of claim 3, wherein an edge of the channel is configured to abut with the button when the blade guard is actuated to cause the blade guard and actuator to move in tandem.

5. The cutter apparatus of claim 1, further comprising a channel structure positioned between the blade guard and the actuator, wherein the blade guard is slidably disposed over a first side of the channel structure and the actuator is slidably disposed under a second side of the channel structure.

6. The cutter apparatus of claim 5, further comprising, a guard return spring attached between the blade guard and the channel structure; and an actuator return spring attached between the actuator and the channel structure.

7. The cutter apparatus of claim 1, further comprising, a blade cover comprising a top portion and a base portion, the blade cover pivotable between a closed position and an open position, wherein the blade cover has a first end that is selectively attachable to the housing and a second end that is pivotally attached to the housing; and a blade storage compartment accessed via an opening formed in a perimeter edge of the blade cover, wherein the blade storage compartment is a void formed between an inner side of the top portion of the blade cover and an inner side of the base portion of the blade cover.

8. The cutter apparatus of claim 7, wherein the blade cover is slidable between a locked position where the blade cover is positioned towards the second end of the housing and an unlocked position where the blade cover is positioned towards a first end of the housing.

9. The cutter apparatus of claim 8, wherein the second end of the blade cover is configured with an engagement member that fits with a recess formed in the housing.

* * * * *